Sept. 15, 1936.    S. R. SHOUP ET AL    2,054,102
VOTING MACHINE
Filed July 25, 1929    27 Sheets-Sheet 3
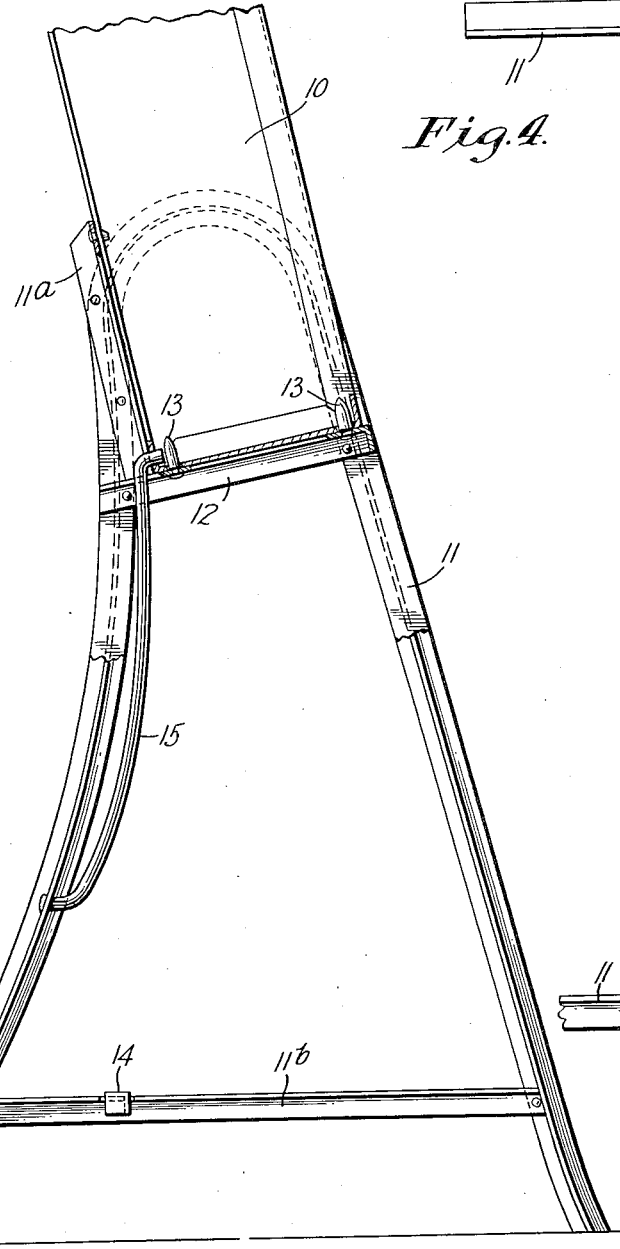
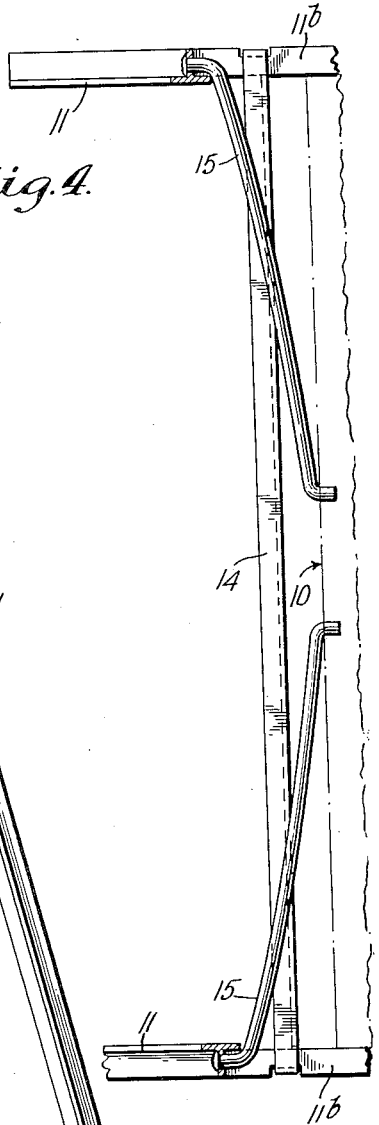
Inventors
Samuel R. Shoup and
Ransom F. Shoup
By their Attorneys
Kenyon + Kenyon

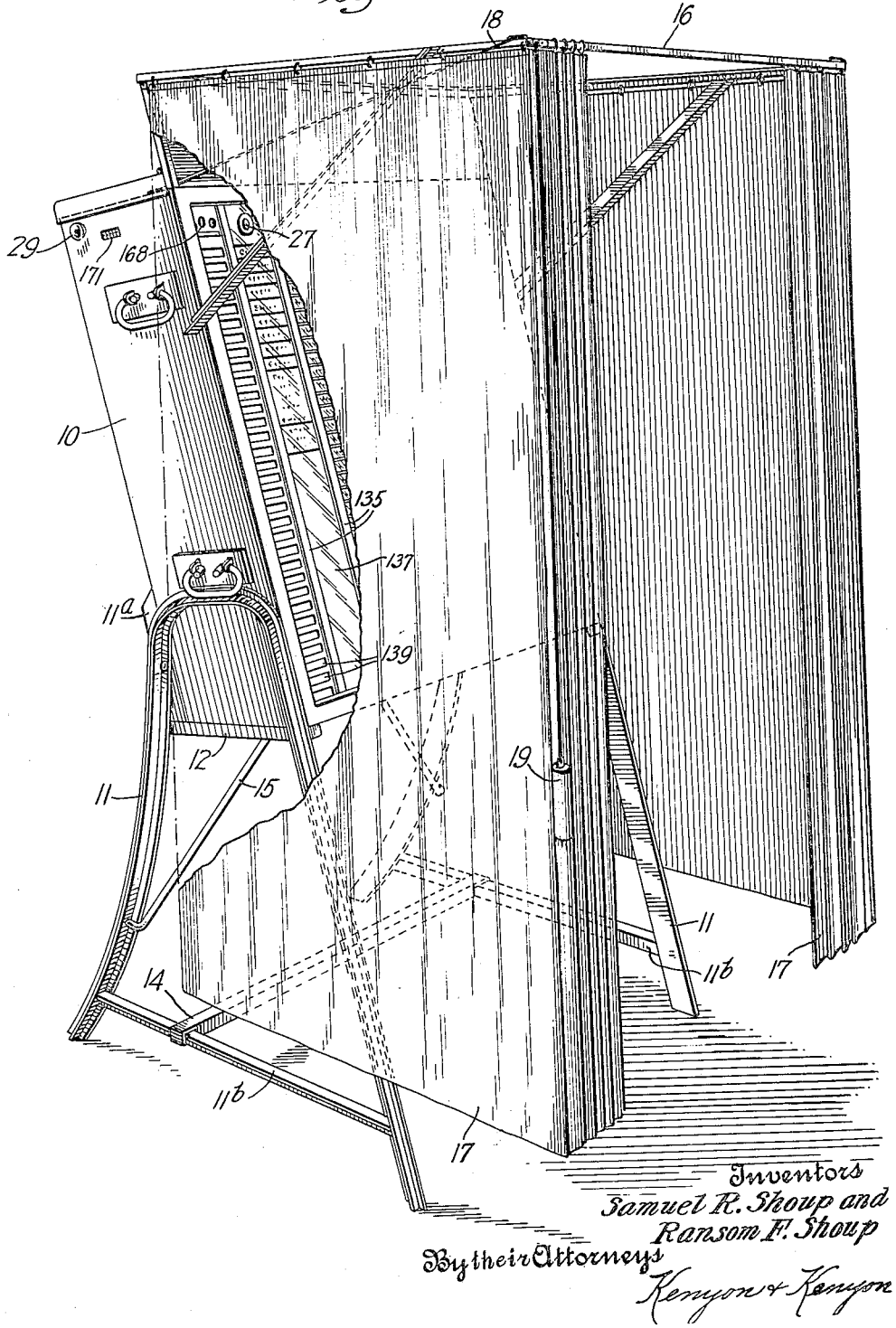

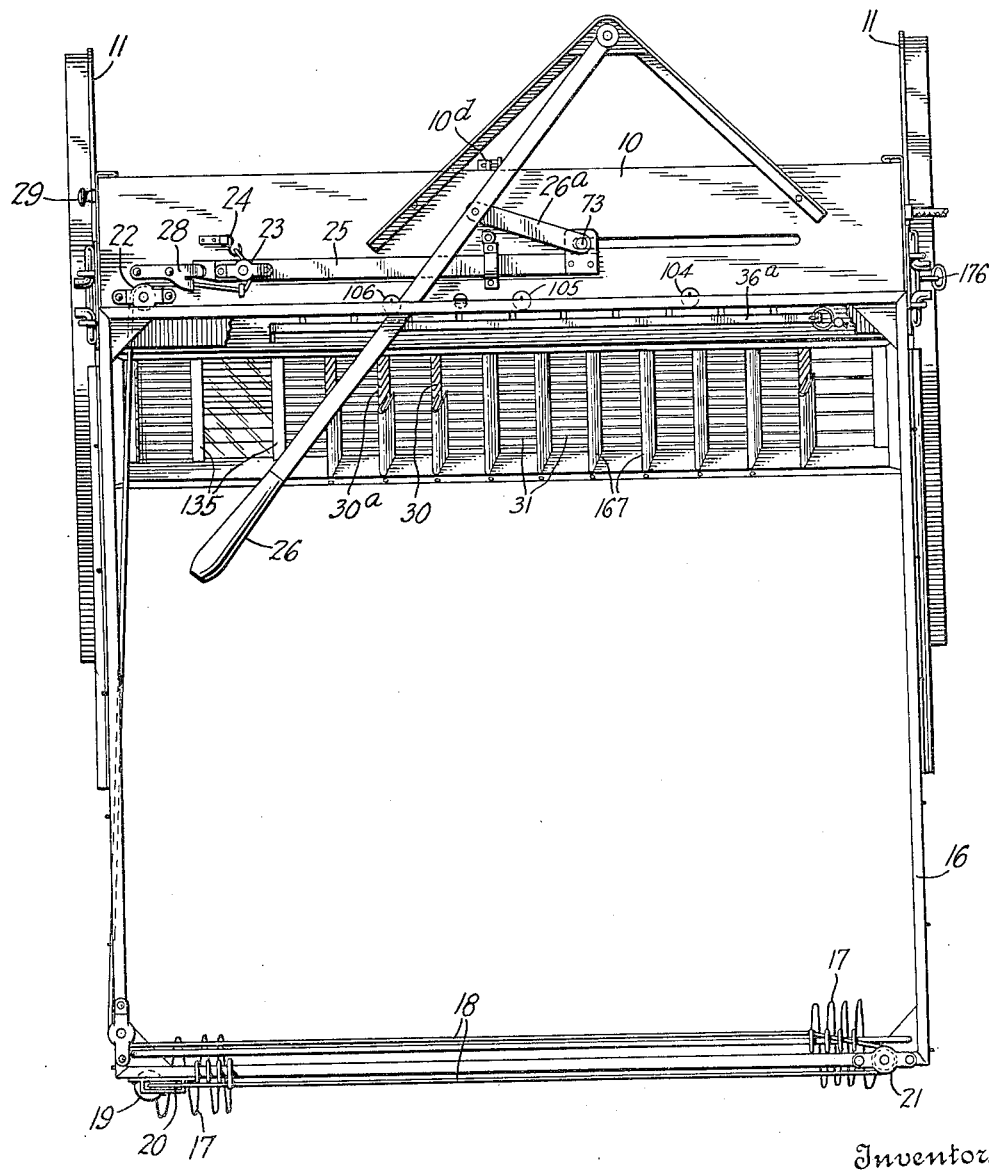

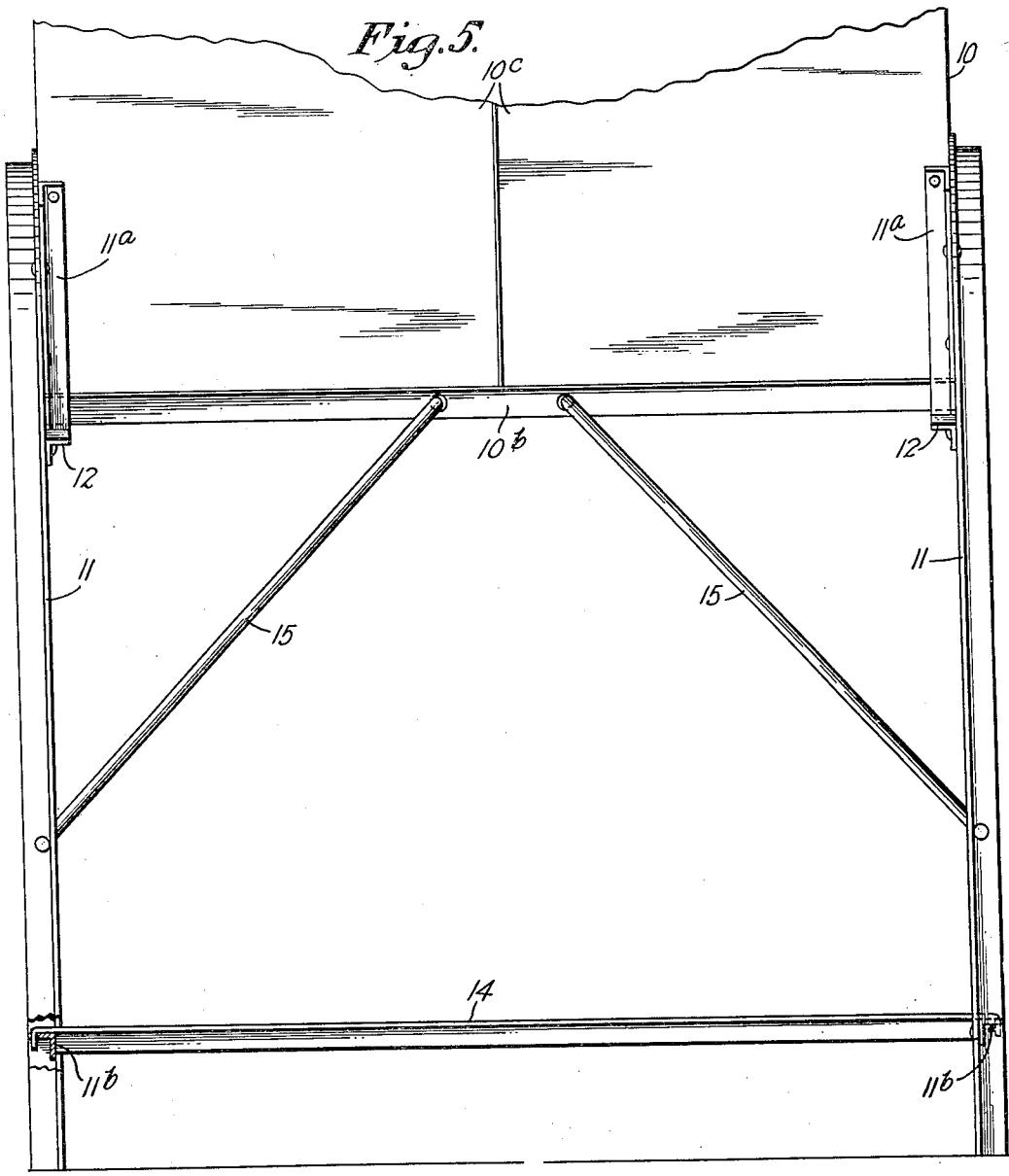

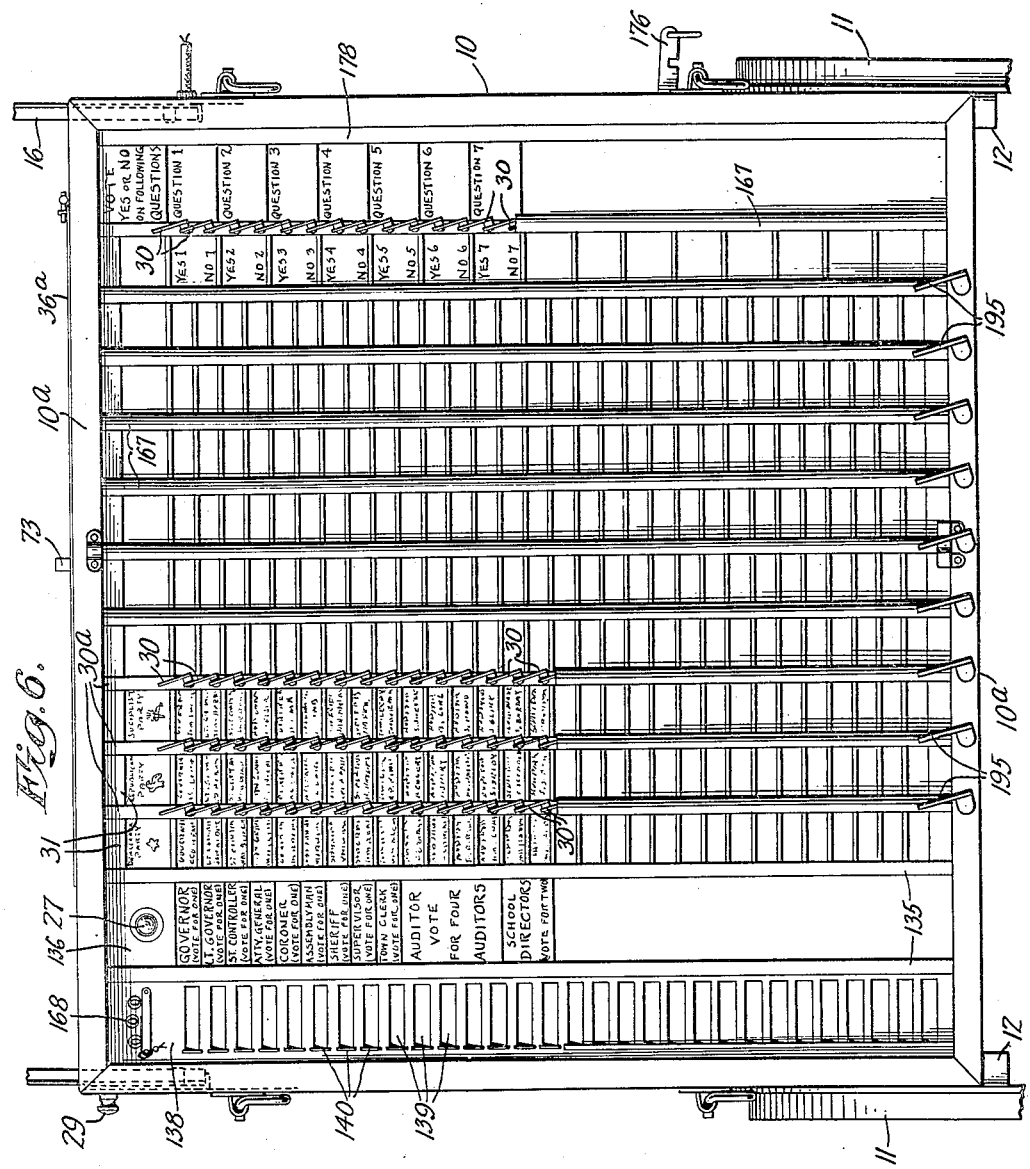

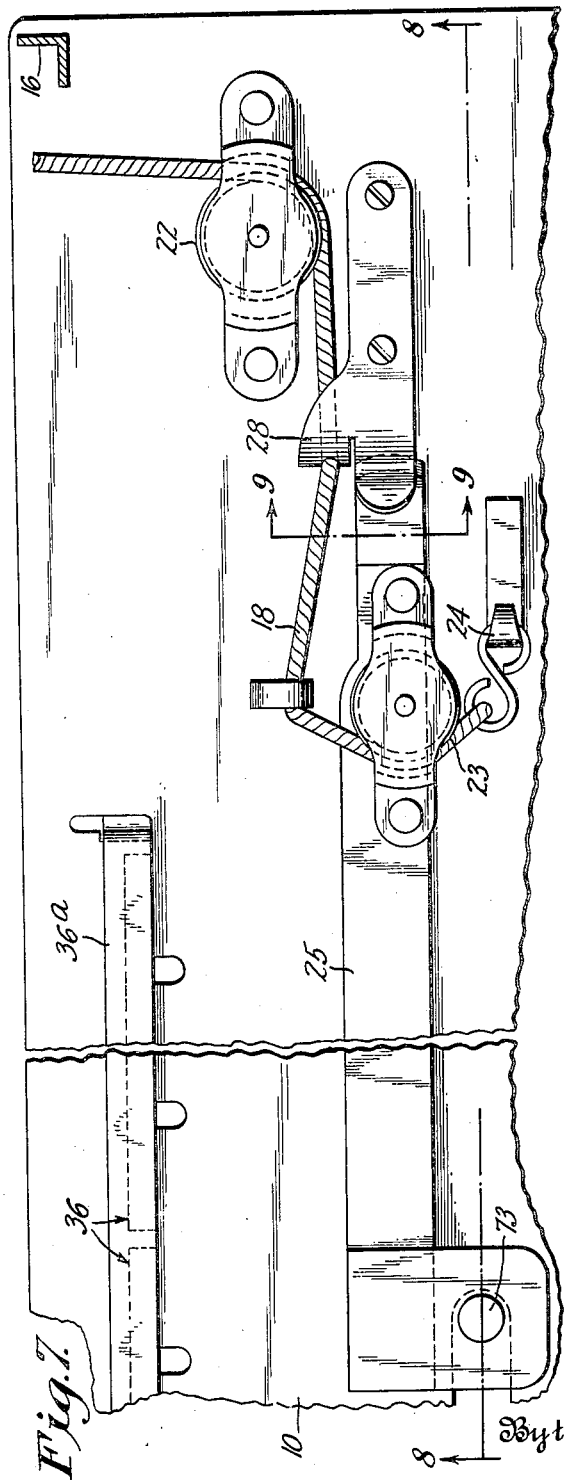
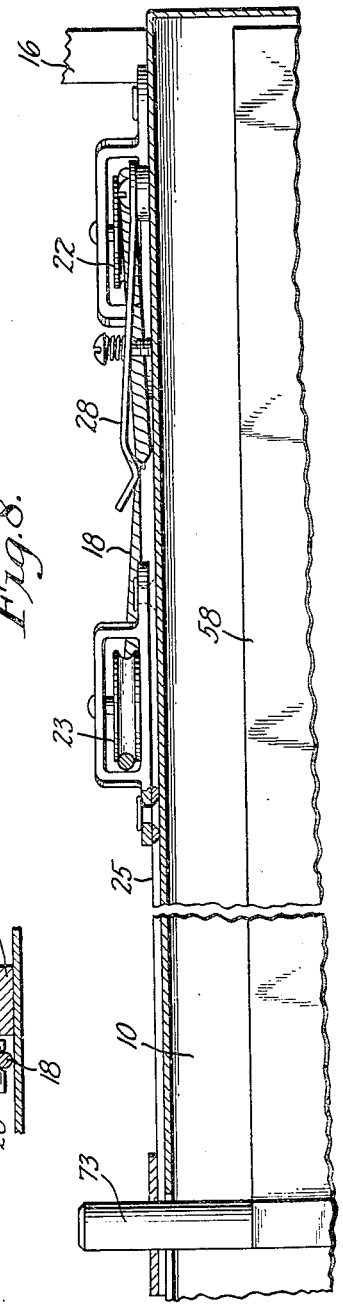

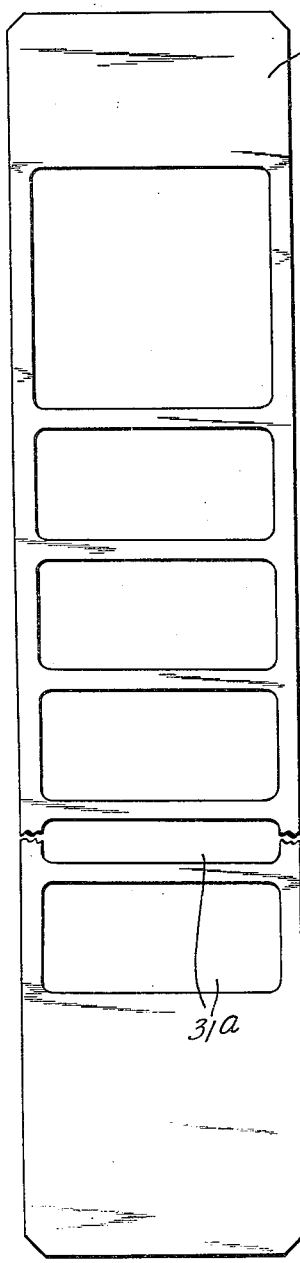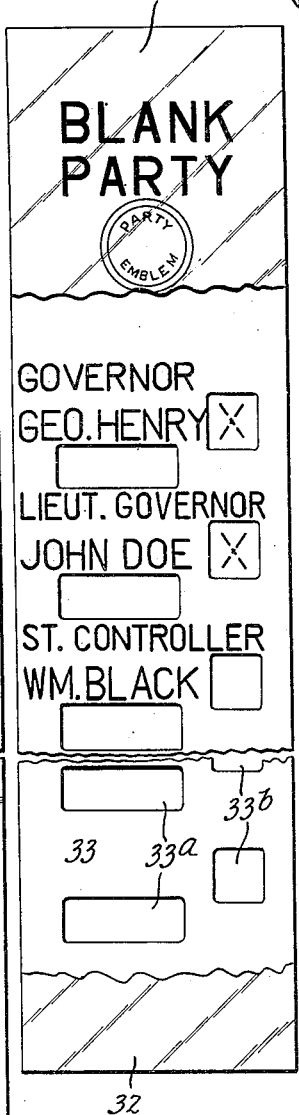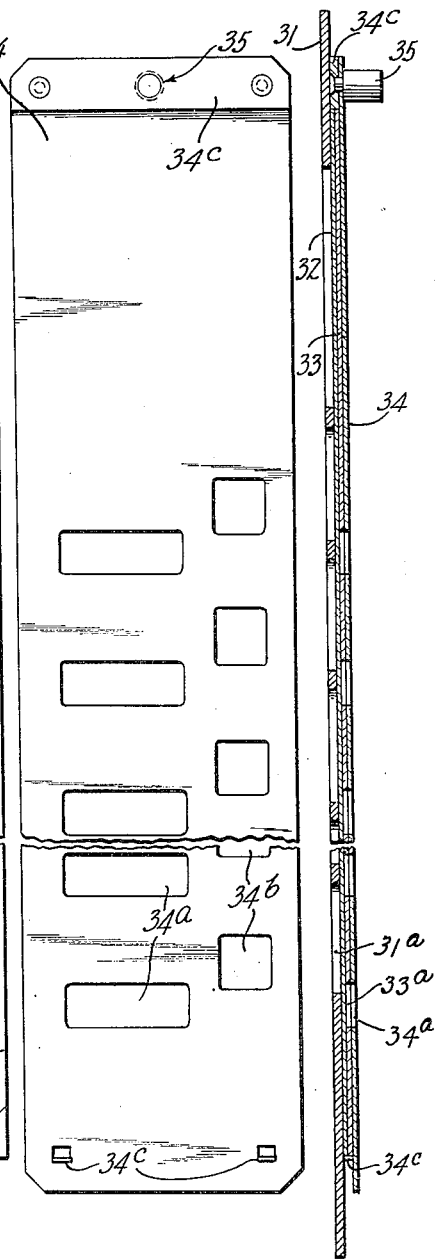

Sept. 15, 1936.   S. R. SHOUP ET AL   2,054,102
VOTING MACHINE
Filed July 25, 1929   27 Sheets-Sheet 8
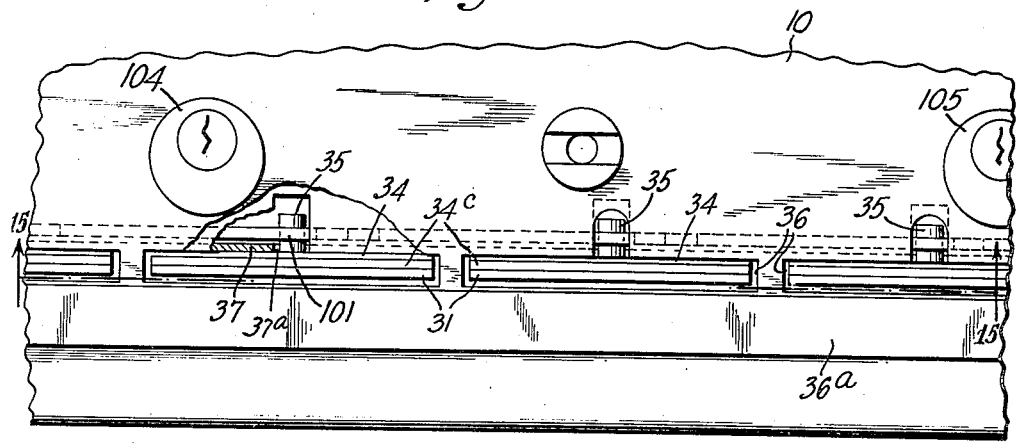
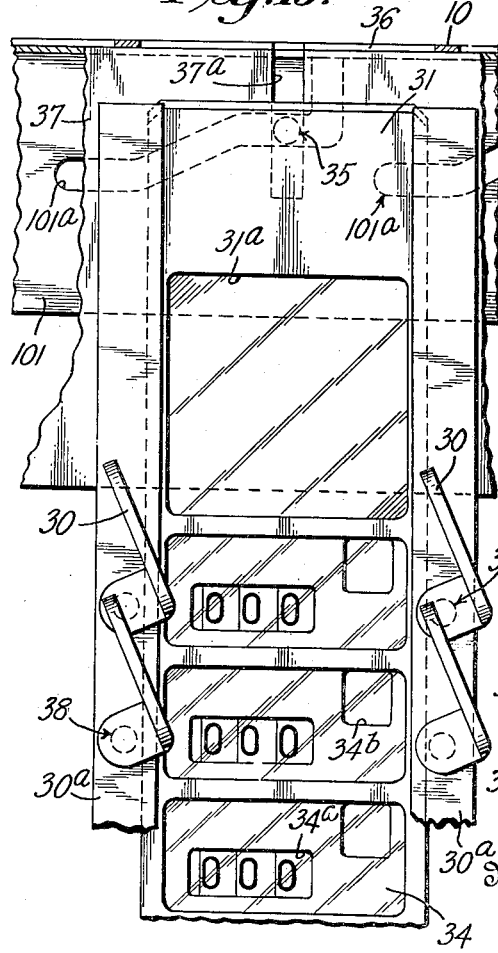
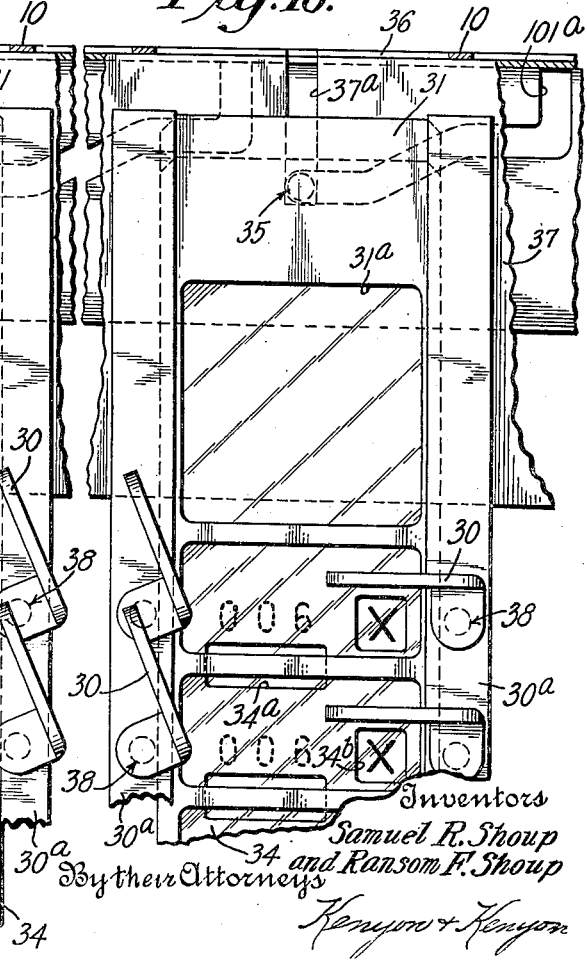
Inventors
Samuel R. Shoup
and Ransom F. Shoup
By their Attorneys
Kenyon & Kenyon

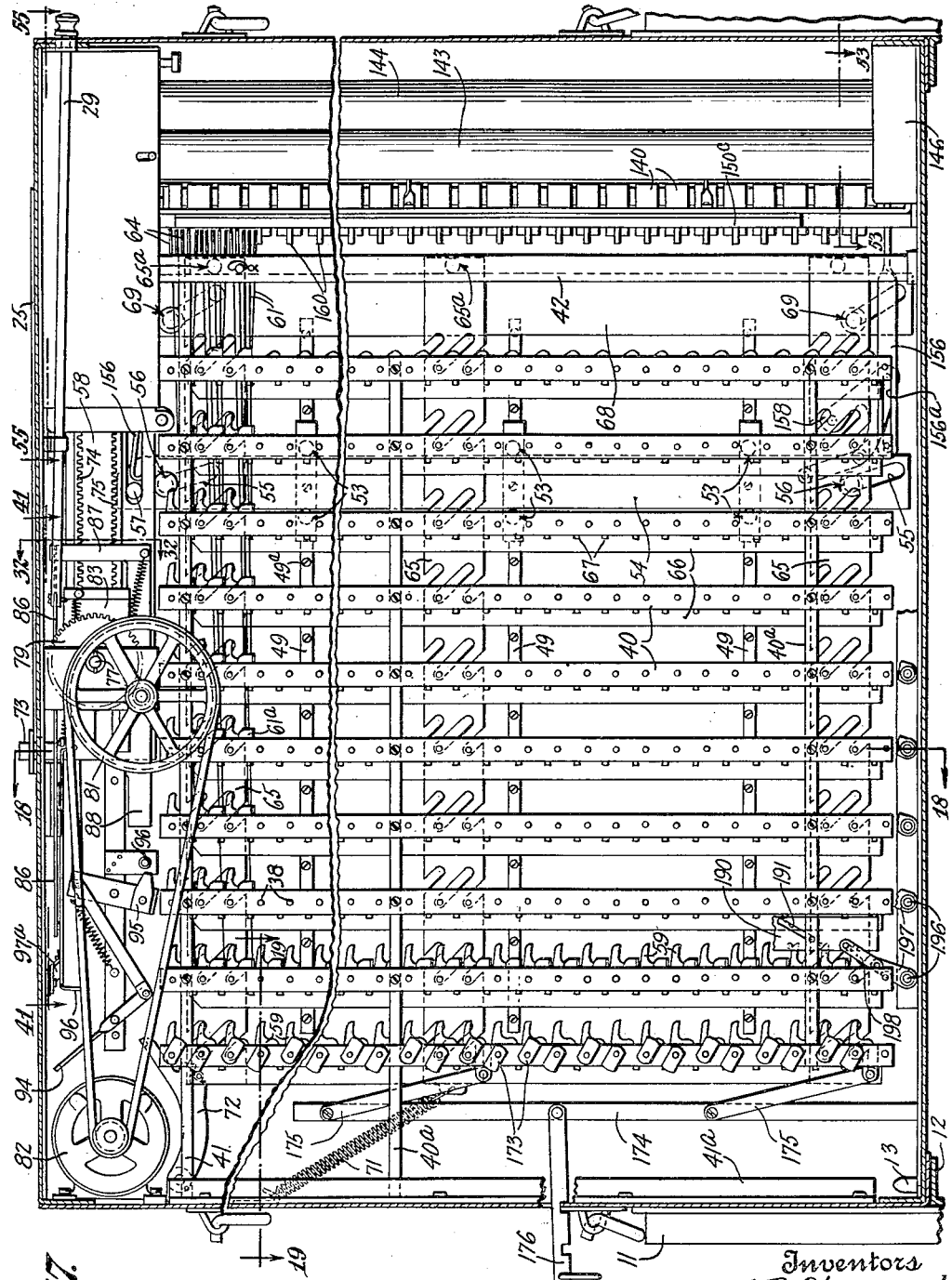

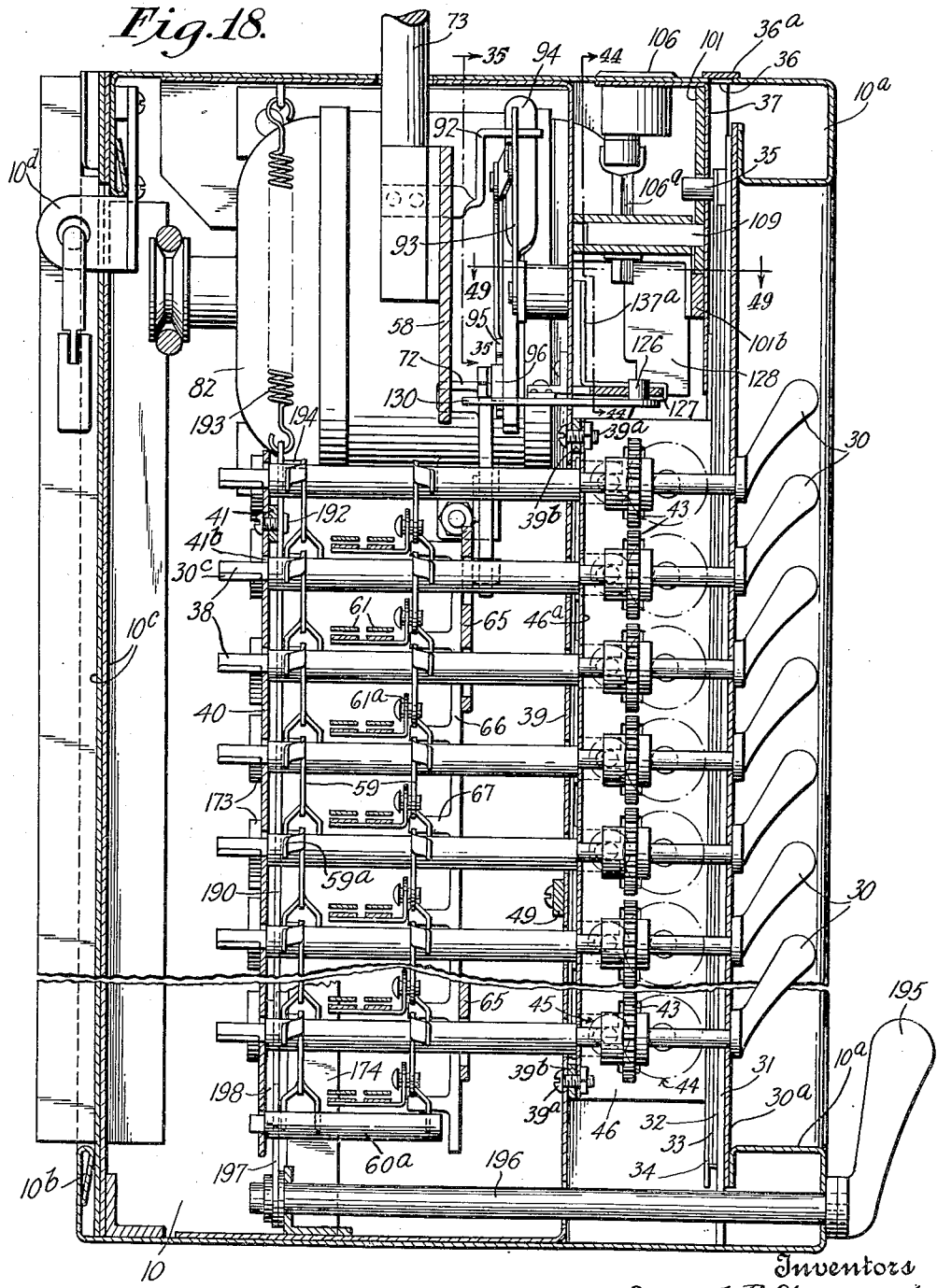

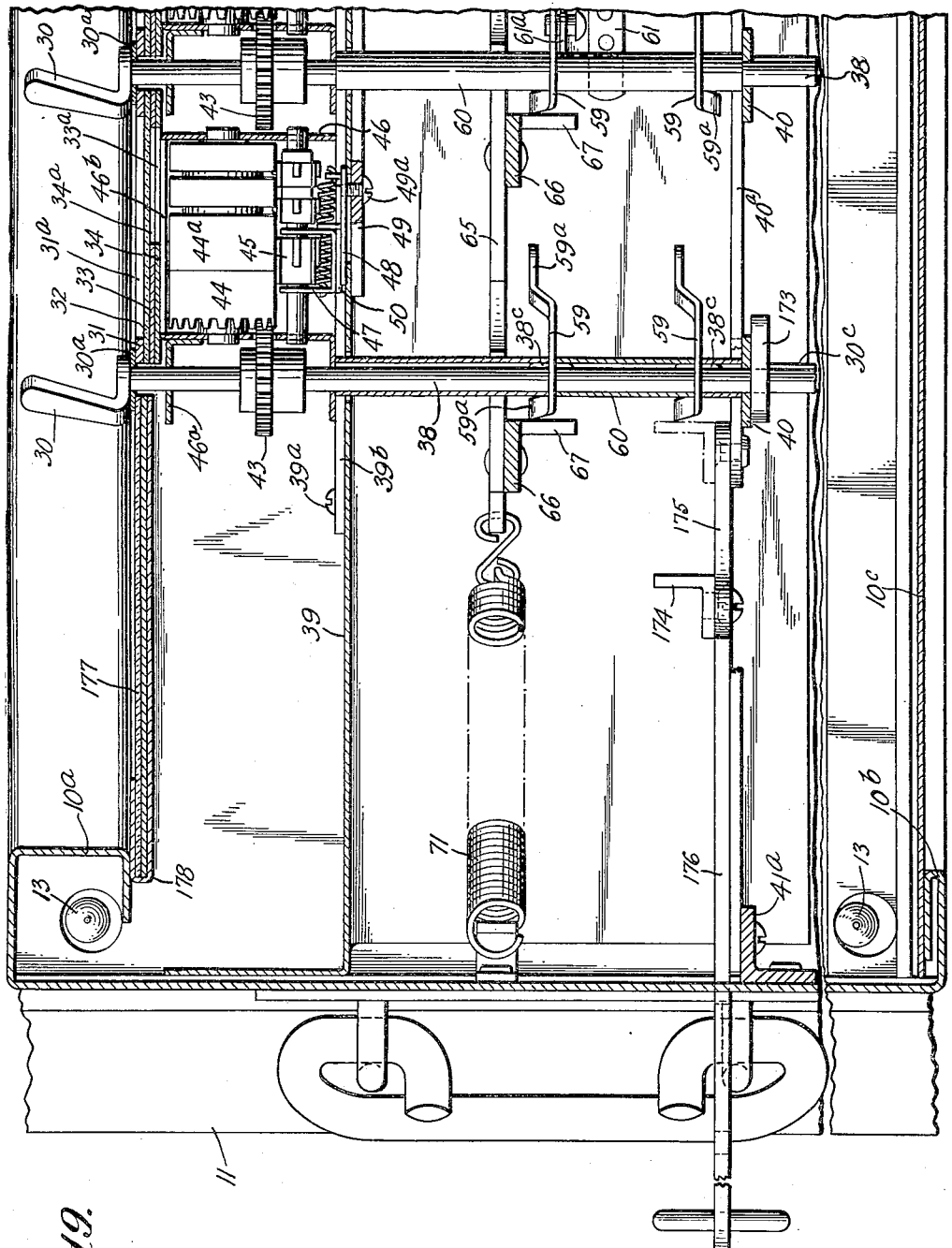

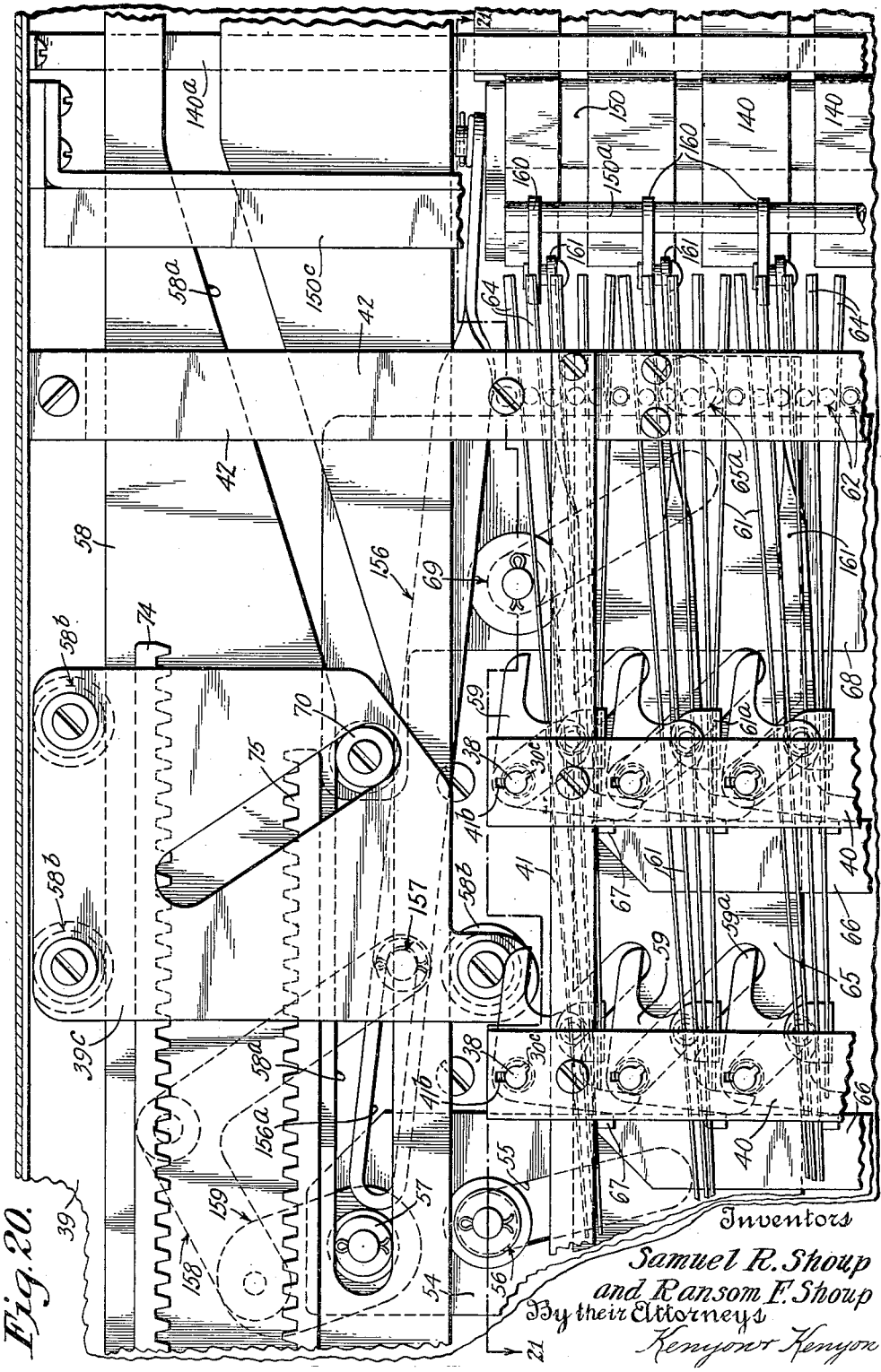

Sept. 15, 1936.   S. R. SHOUP ET AL   2,054,102
VOTING MACHINE
Filed July 25, 1929   27 Sheets—Sheet 13

Fig. 21.

Inventors
Samuel R. Shoup
and Ransom F. Shoup
By their Attorneys
Kenyon & Kenyon

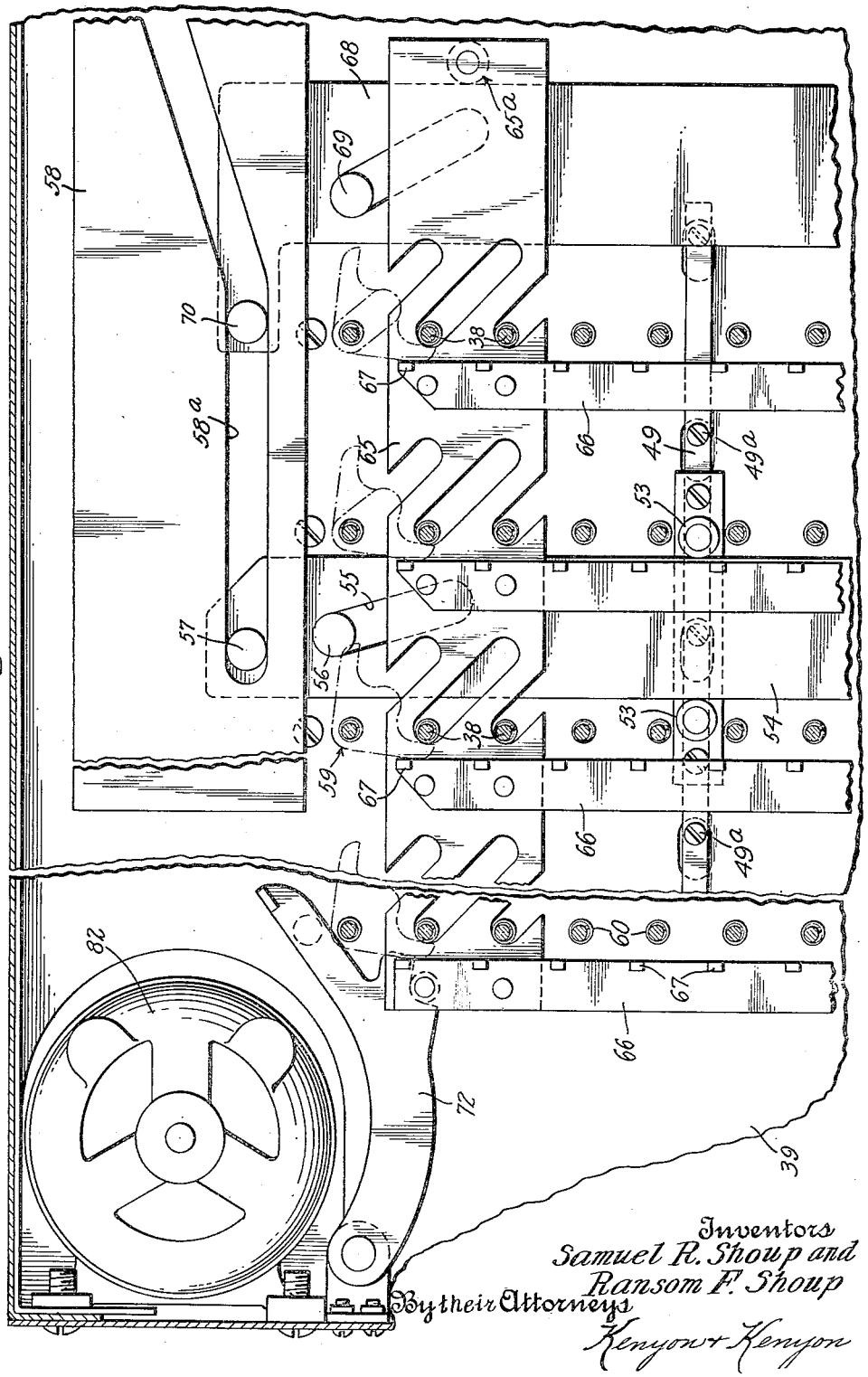

Sept. 15, 1936.    S. R. SHOUP ET AL    2,054,102
VOTING MACHINE
Filed July 25, 1929    27 Sheets-Sheet 15
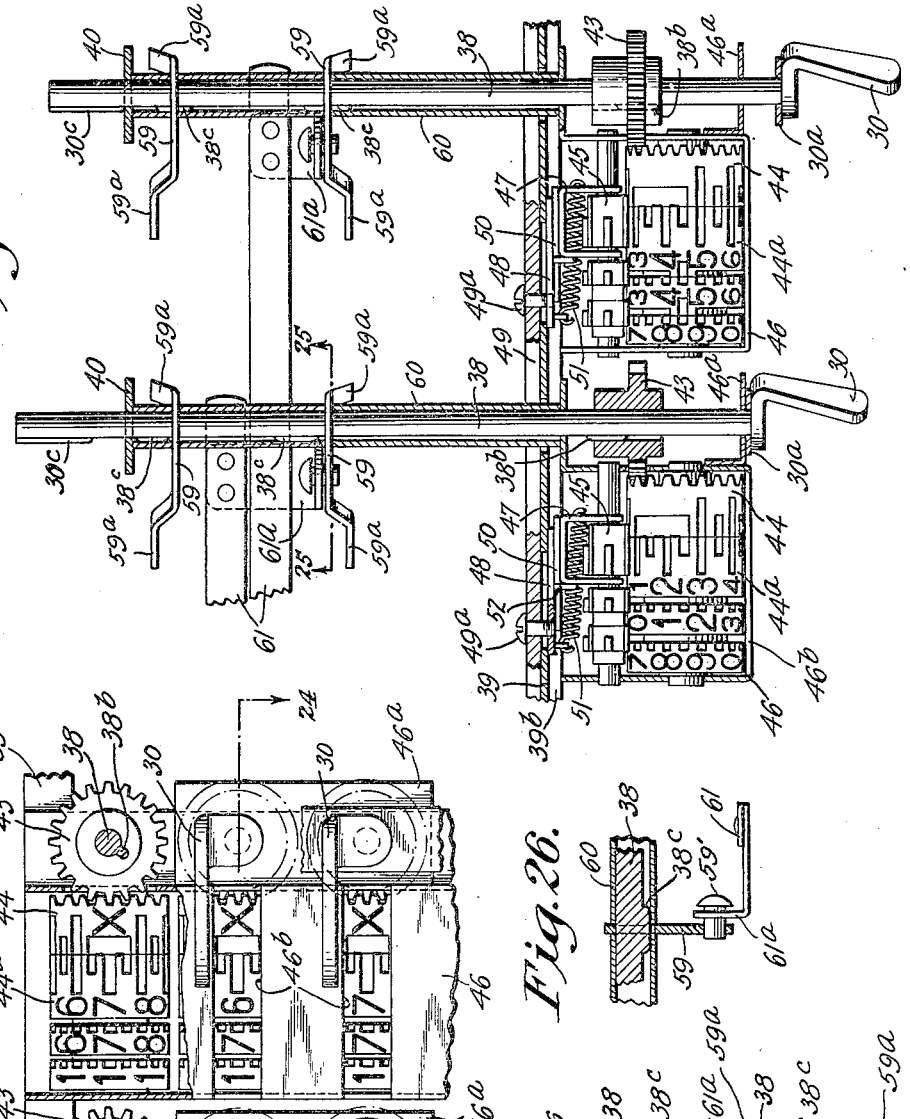
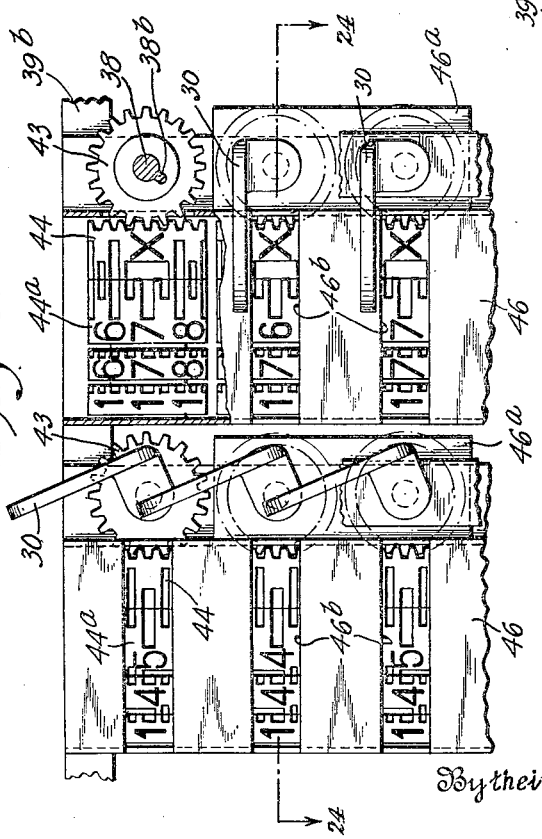
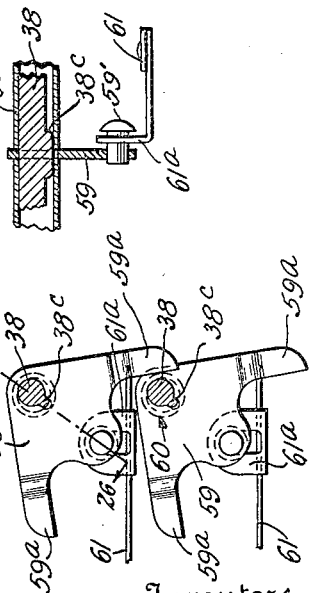
Inventors
Samuel R. Shoup and
Ransom F. Shoup
By their Attorneys
Kenyon & Kenyon

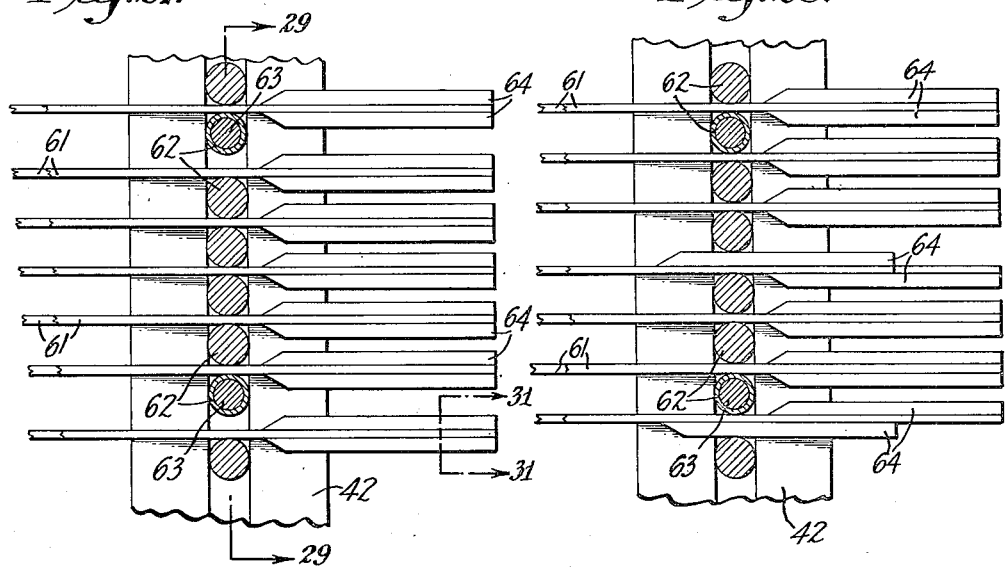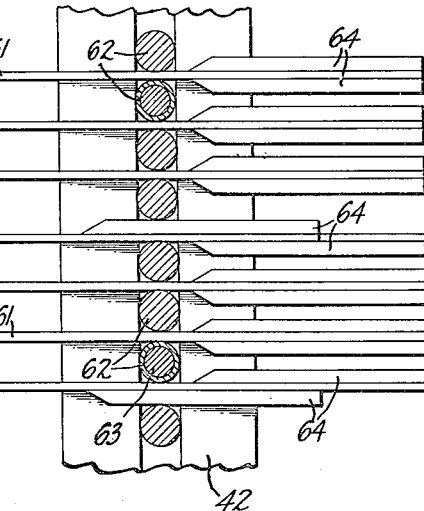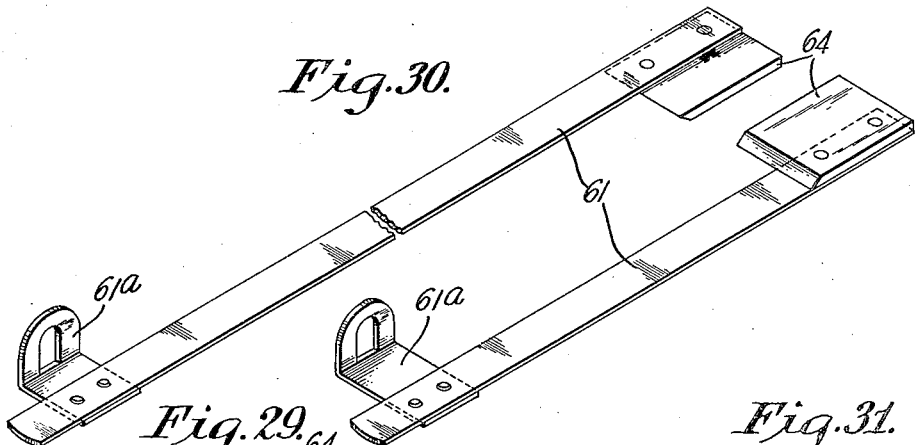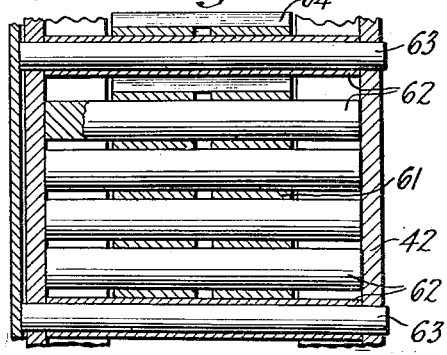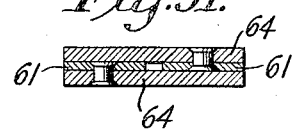

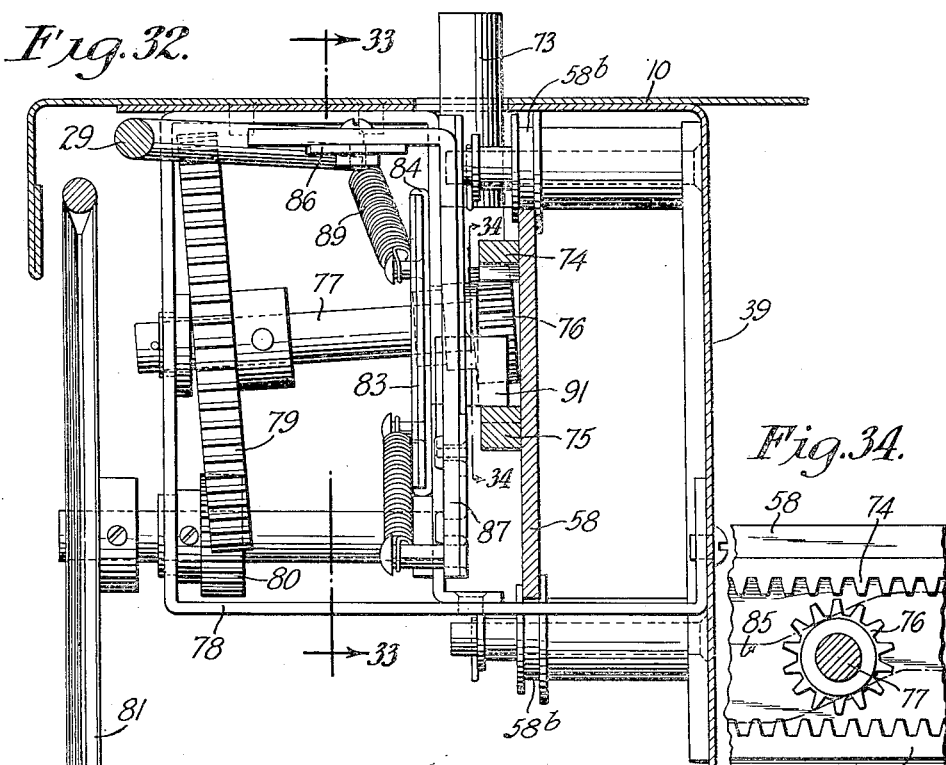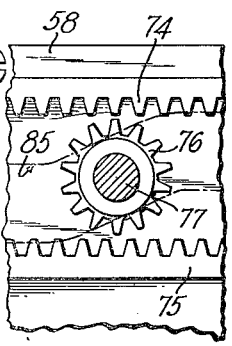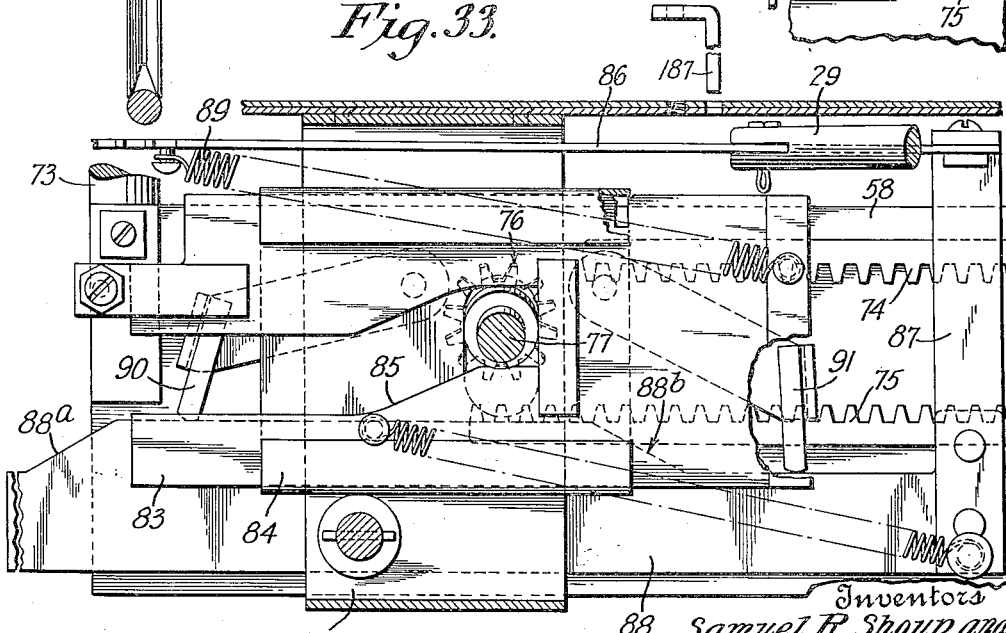

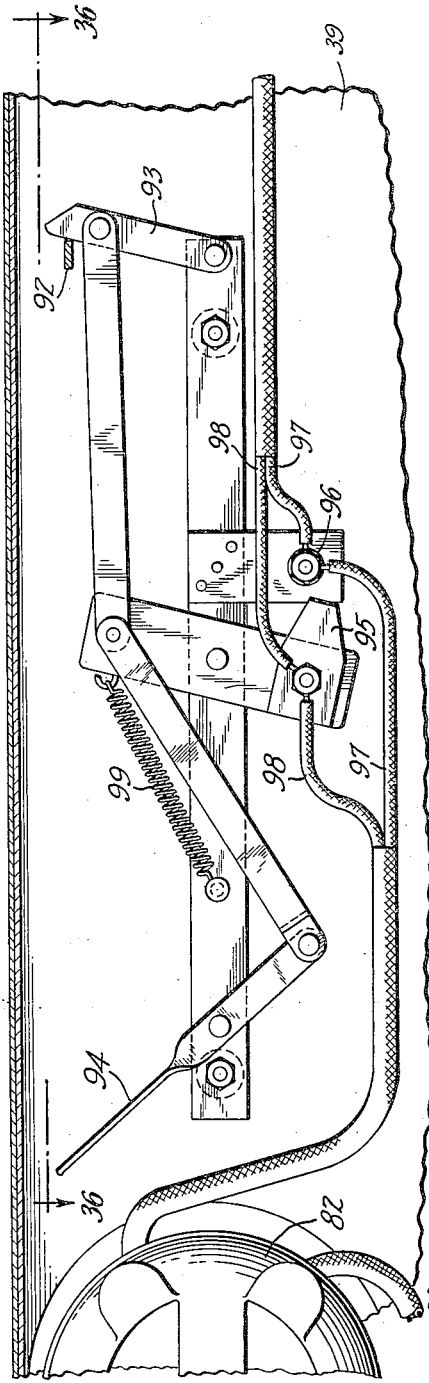

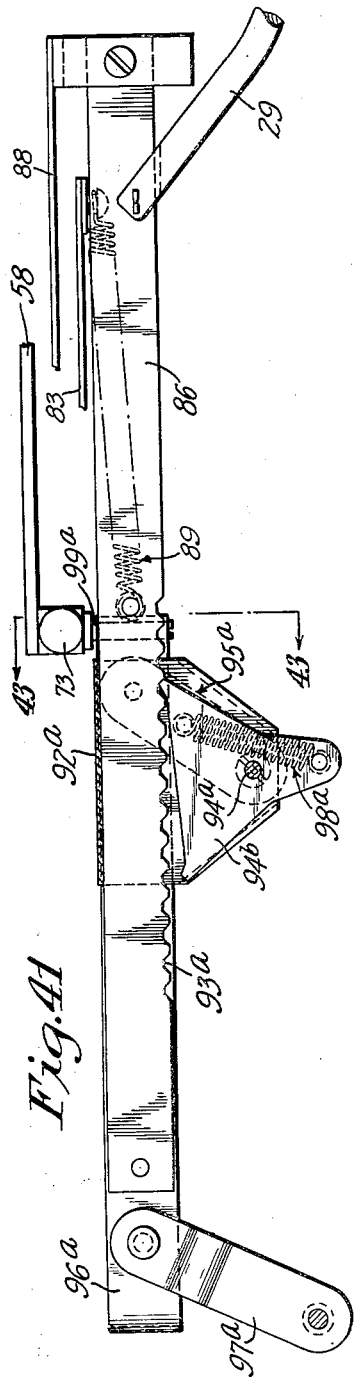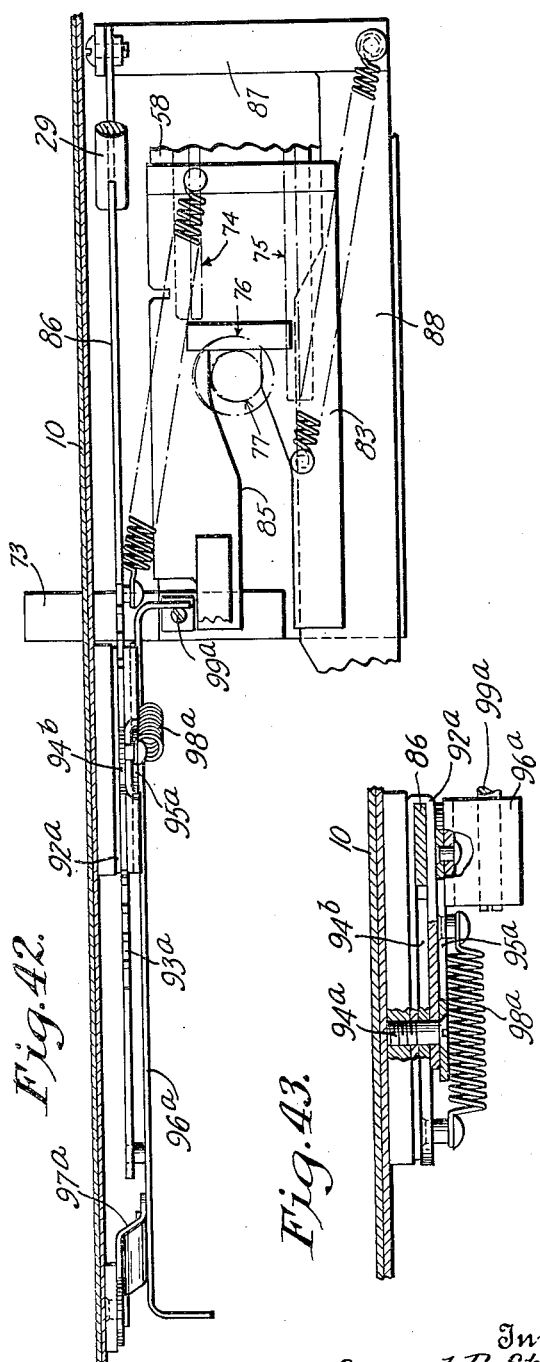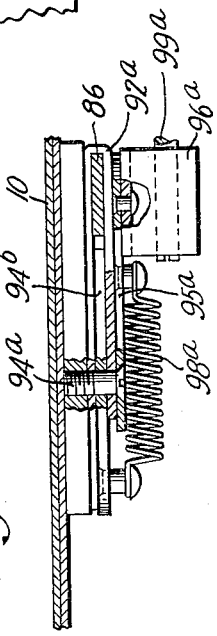

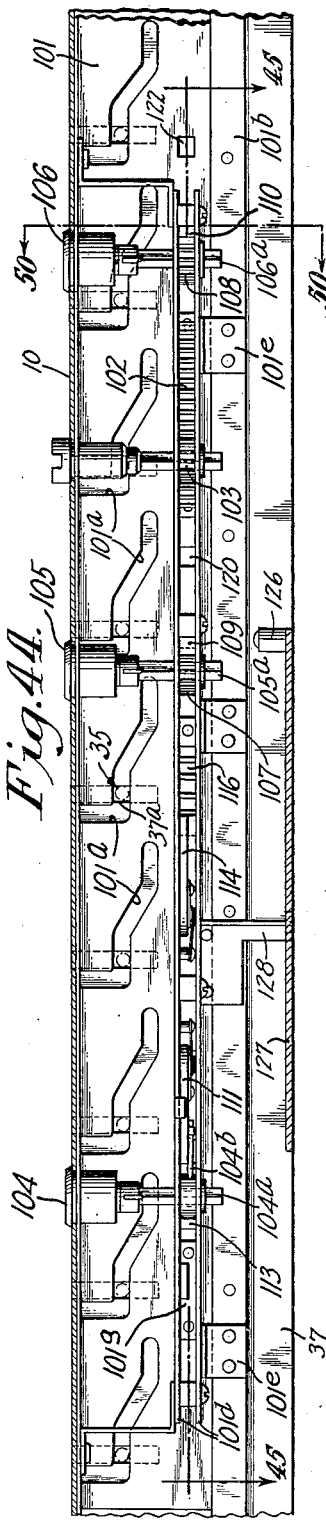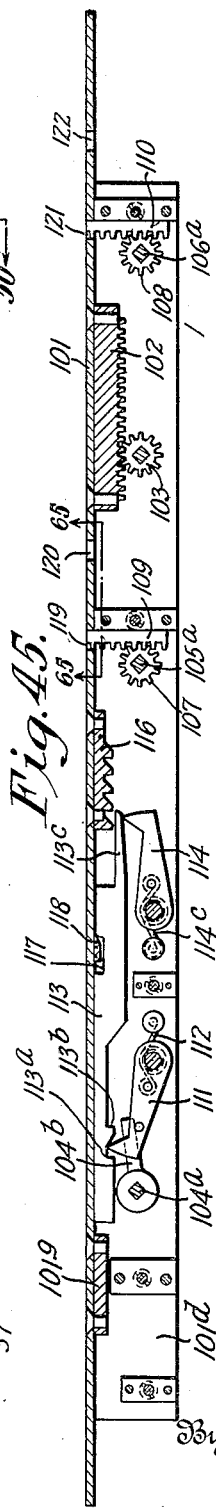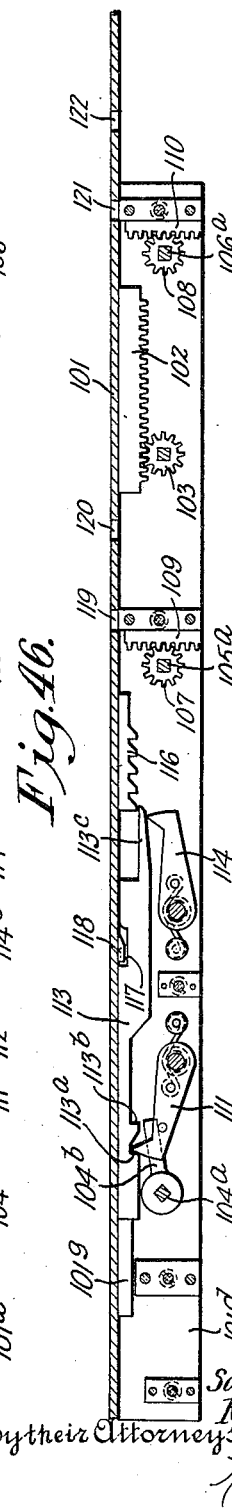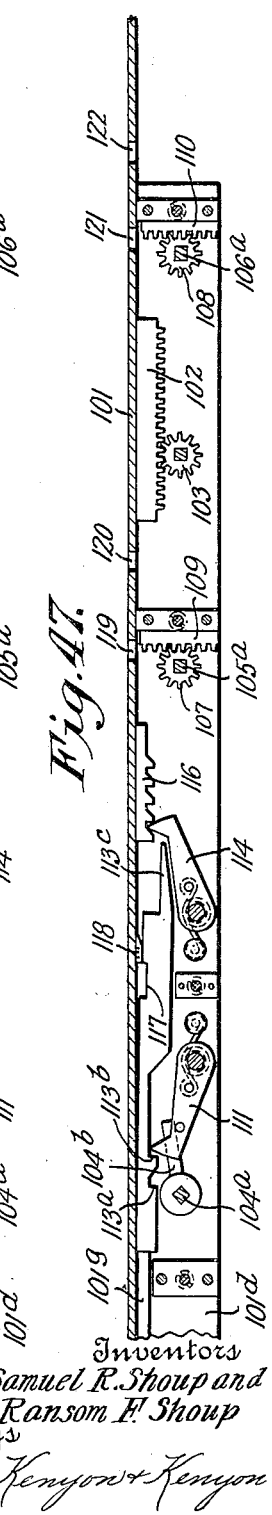

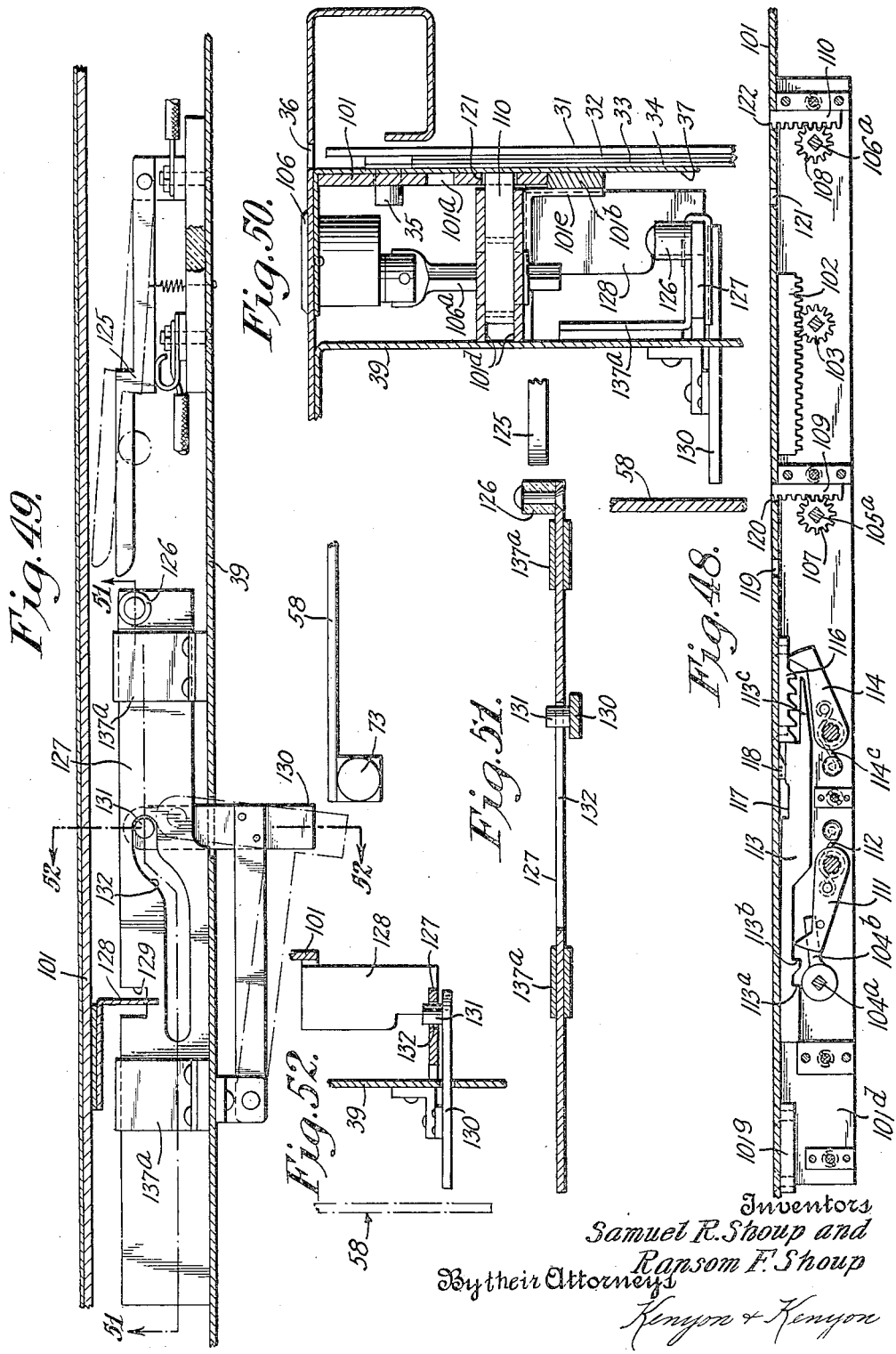

Sept. 15, 1936.  S. R. SHOUP ET AL  2,054,102
VOTING MACHINE
Filed July 25, 1929  27 Sheets-Sheet 22

Inventors
Samuel R. Shoup and
Ransom F. Shoup
By their Attorneys
Kenyon & Kenyon Sept. 15, 1936.   S. R. SHOUP ET AL   2,054,102
VOTING MACHINE
Filed July 25, 1929   27 Sheets-Sheet 23

Inventors
Samuel R. Shoup and
Ransom F. Shoup
By their Attorneys
Kenyon & Kenyon Sept. 15, 1936.   S. R. SHOUP ET AL   2,054,102
VOTING MACHINE
Filed July 25, 1929   27 Sheets-Sheet 25

Inventors
Samuel R. Shoup and
Ransom F. Shoup
By their Attorneys
Kenyon & Kenyon

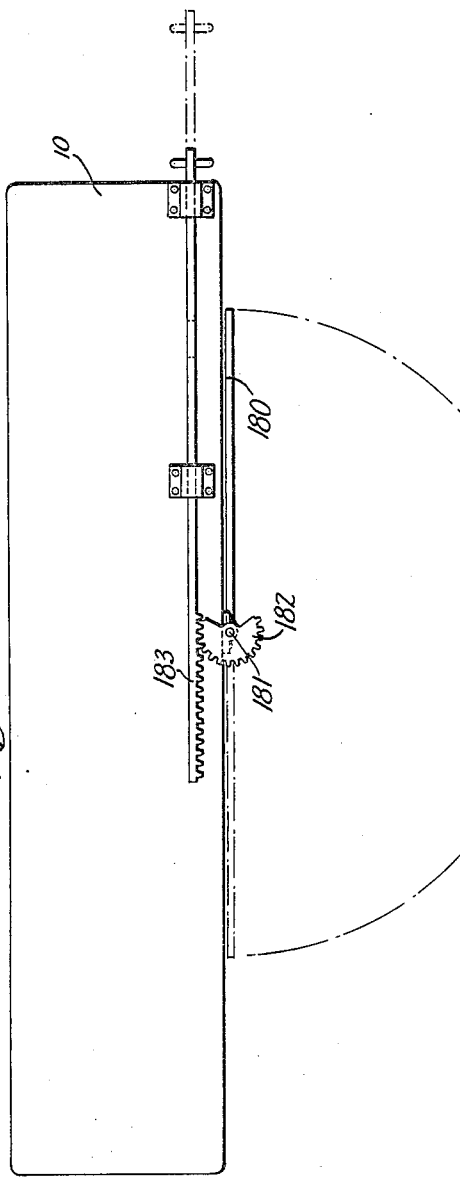
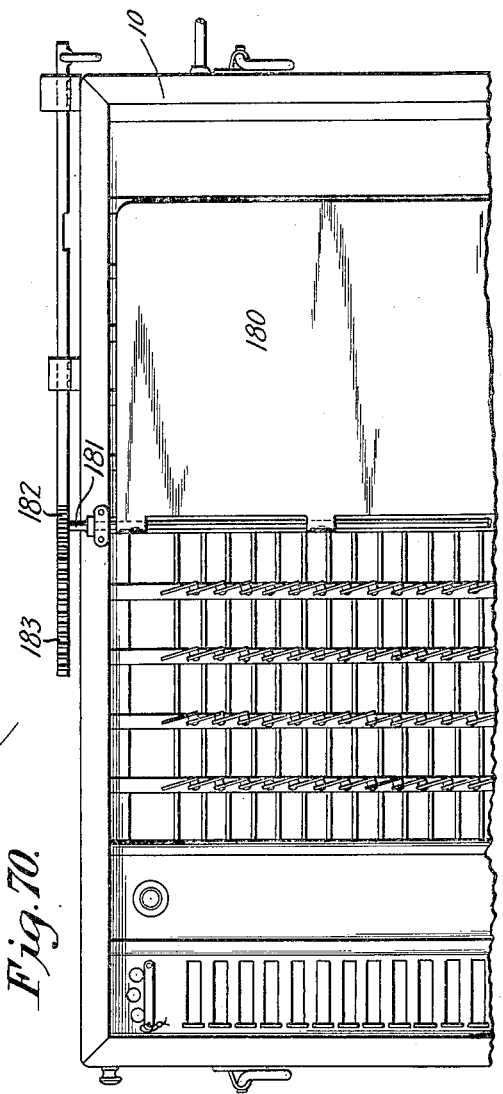

Sept. 15, 1936.　　　S. R. SHOUP ET AL　　　2,054,102
VOTING MACHINE
Filed July 25, 1929　　　27 Sheets-Sheet 27
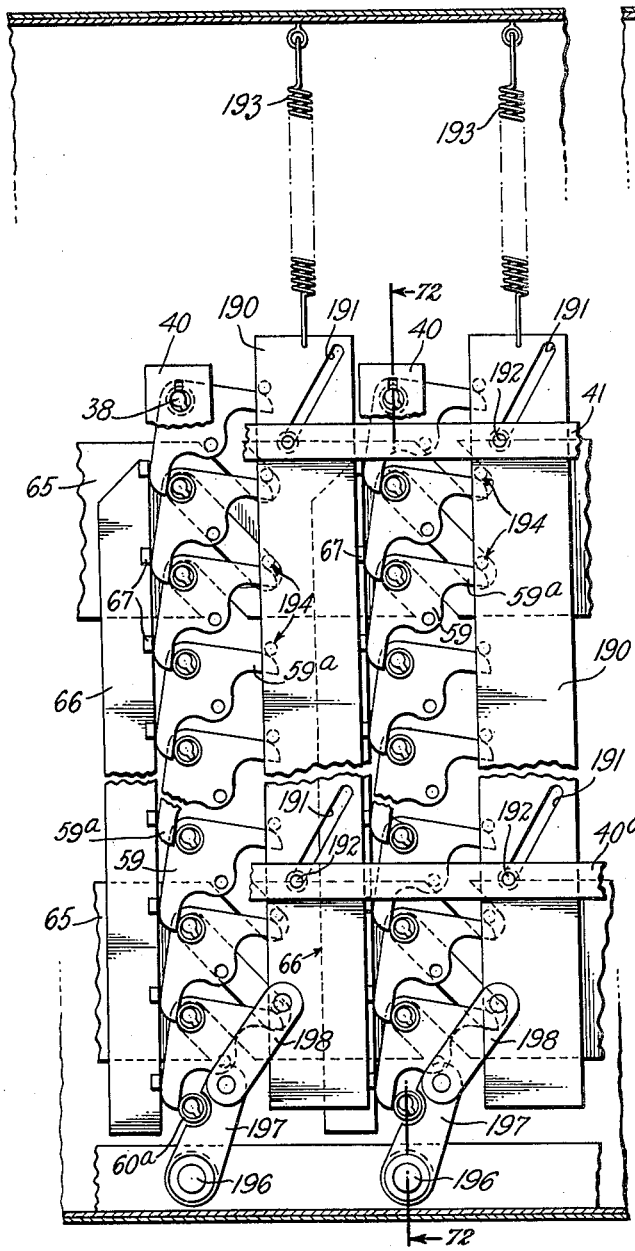
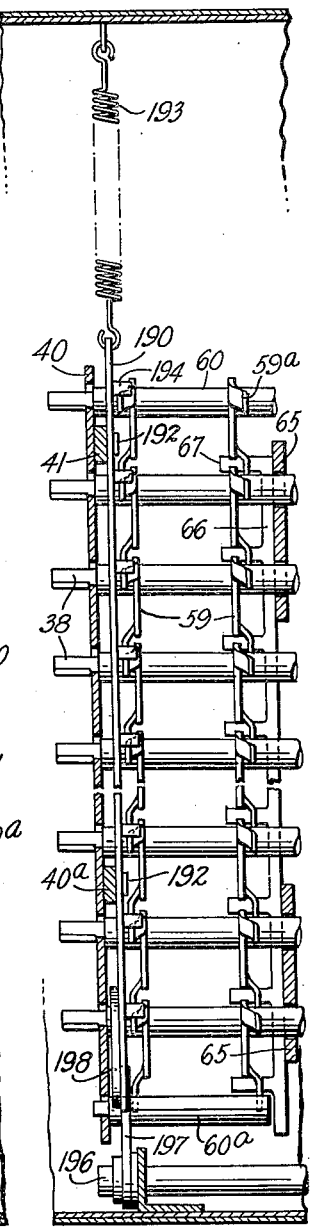
Inventors
Samuel R. Shoup and
Ransom F. Shoup
By their Attorneys
Kenyon & Kenyon Patented Sept. 15, 1936

2,054,102

UNITED STATES PATENT OFFICE 2,054,102

VOTING MACHINE

Samuel R. Shoup and Ransom F. Shoup, Weehawken, N. J., assignors to The Shoup Voting Machine Corp., Brooklyn, N. Y., a corporation of New Jersey Application July 25, 1929, Serial No. 380,839
Renewed April 4, 1935

63 Claims. (Cl. 235—54)

This invention relates to voting machines or machines for registering the ballots of individual voters in elections and giving the sum totals of all votes cast for the respective candidates at the conclusion of the balloting.

An object of this invention is a voting machine which registers the votes accurately, prevents fraudulent voting, indicates to the voter the candidate for whom he has voted, and which is provided with safeguards to prevent tampering with the vote registering mechanism.

A machine embodying the invention may be used in municipal, state and national elections as well as in primary elections. It may quickly and easily be operated by a voter without mistake to vote either a straight party ticket or a split ticket. The machine is provided with a plurality of columns of oscillatable handles, each column being for a different political party and corresponding handles of the columns being for the same office. The candidates' names and the offices for which they are candidates are listed vertically on ballots arranged adjacent the voting handles. The ballots are supported on shutters and are provided with transparent protectors. These ballot assemblies are introduceable and removable from the machine as units. The ballots are so positioned that each key, when oscillated, overlies the name of the candidate allotted to that handle and an aperture is provided through which is visible an indicator carried by the counter for that handle. Thus, the voter may make certain that he has operated the proper handle.

Slots are provided in the ballot assemblies through which, when the assemblies are properly arranged, may be seen the totals on the counters. When the machine is in use, the ballot assemblies are arranged with the slots out of register with the counter, but are arranged with the slots in register before and after use of the machine. It is thus possible for the election inspectors to ascertain that the counters are set at zero before the voting commences and to obtain the totals after the voting is finished. The operation of the ballot assemblies is controlled by two or more keys in the possession of the inspectors for the different political parties. The machine is locked against operation when the ballot assemblies are in position to render the counters visible and all of the inspectors' keys must be used to unlock the ballot assemblies and condition the machine for use. At the termination of the voting, the inspectors' keys again must be used to allow the ballot assemblies to be moved to render the counters visible so that the totals may be obtained and the arrangement is such that in this condition the inspectors' keys cannot be removed. The machine in this condition is locked against operation and cannot again be operated until unlocked by use of a key held by the supervisor of elections.

The machine may be operated either manually or electrically and is provided with a curtain which is closed to conceal the voter while registering his vote. This curtain is held closed until after the vote has been registered and the voting handles returned to normal position, thus insuring complete secrecy for the voter. The machine is provided with means under the control of an attendant for permitting the voter to condition the machine before voting and to restore the same after voting and register his vote, and means are also provided to prevent a second operation of said means by the attendant until after the voter has effected conditioning or resetting of the machine. Means are provided to permit the voter to cast his vote for a candidate whose name does not appear on any ballot and interlocking means are provided to prevent a voter from casting a ballot for more than one candidate for the same office, except in connection with the election of members of a board or the like where each party nominates a given number of candidates and the voter may make his choice of a given number from the total block of candidates.

The voting mechanism is contained within a boxlike casing which is supported above a knockdown frame which is easily and quickly assembled or disassembled. The machine, when knocked down, may be compactly arranged for shipment and is of sufficiently light construction that it can be easily handled by two men. The casing is divided by a vertical partition and the rear end of the casing is closed by a removable wall which is normally locked in closing position. By removal of the rear wall, access may be had to the control mechanism of the machine.

Many other objects, novel features and advantages of this invention will be apparent from the following specification and accompanying drawings, wherein Figure 1 is a perspective view of a voting machine constructed in accordance with this invention;

Fig. 2 is a plan view thereof;

Fig. 3 is a fragmentary side elevation partially broken away;

Fig. 4 is a plan view of the supporting frame;

Fig. 5 is a partial rear view;

Fig. 6 is a partial front elevation;

Fig. 7 is a partial enlarged plan view;

Figure 53:
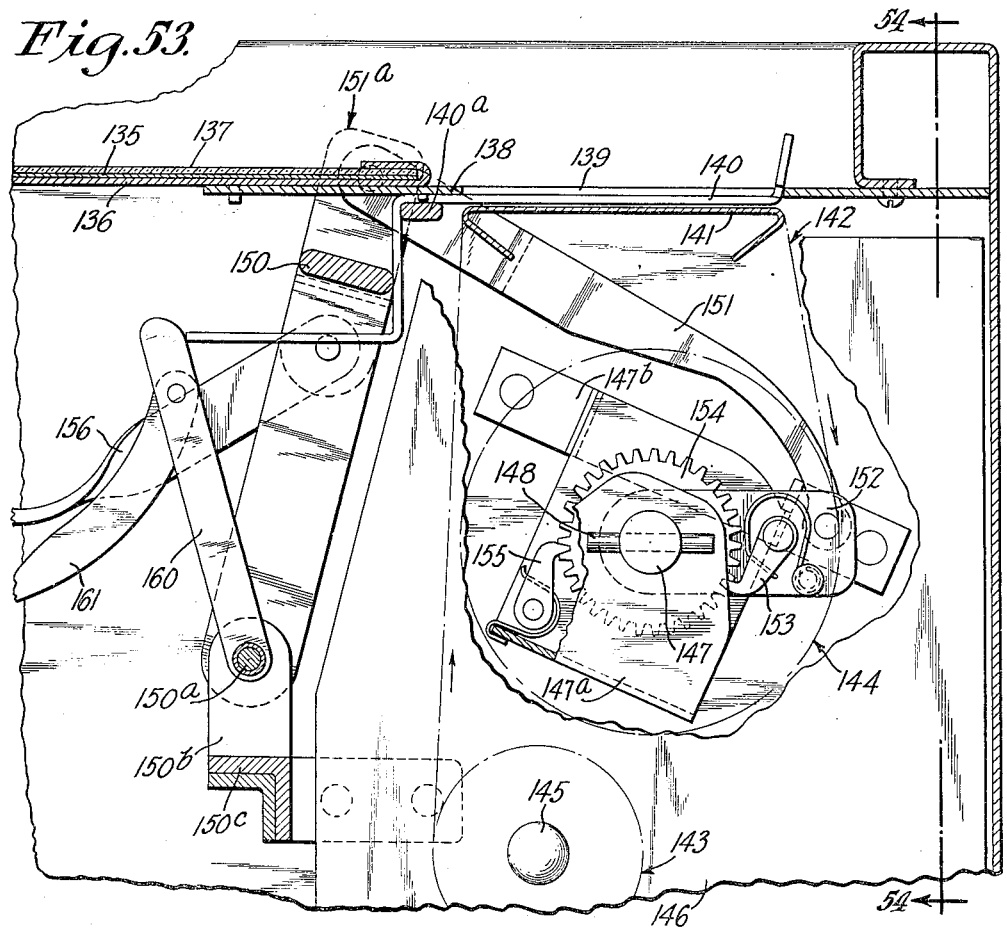
Figure 54:
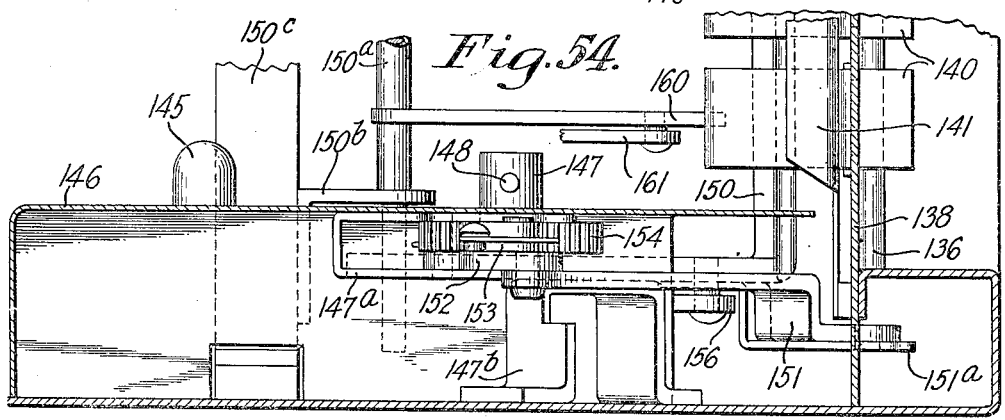
Figure 55:
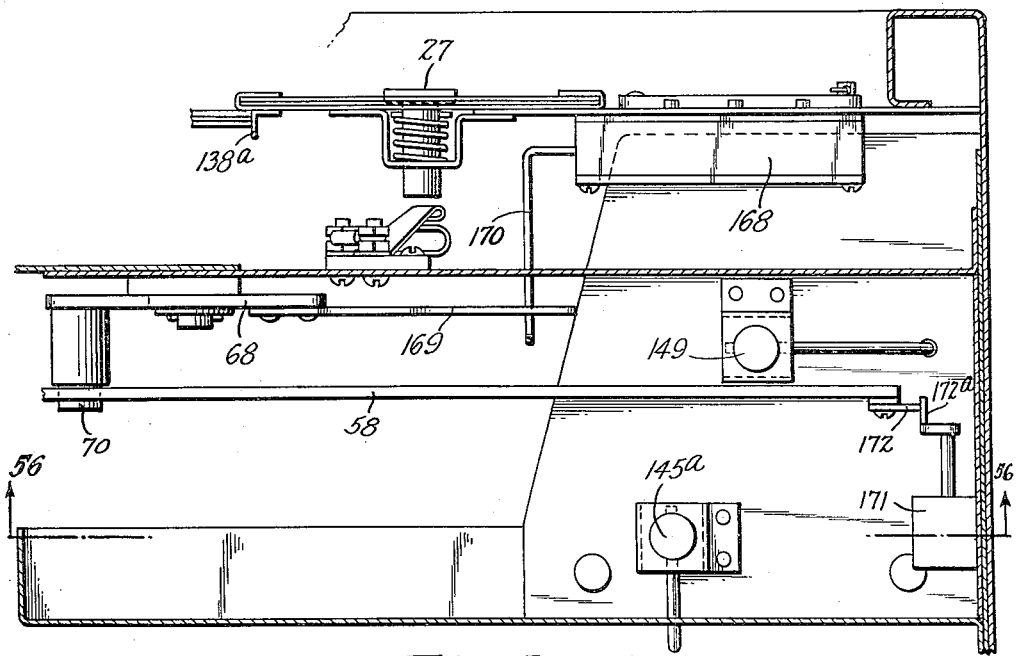
Figure 56:
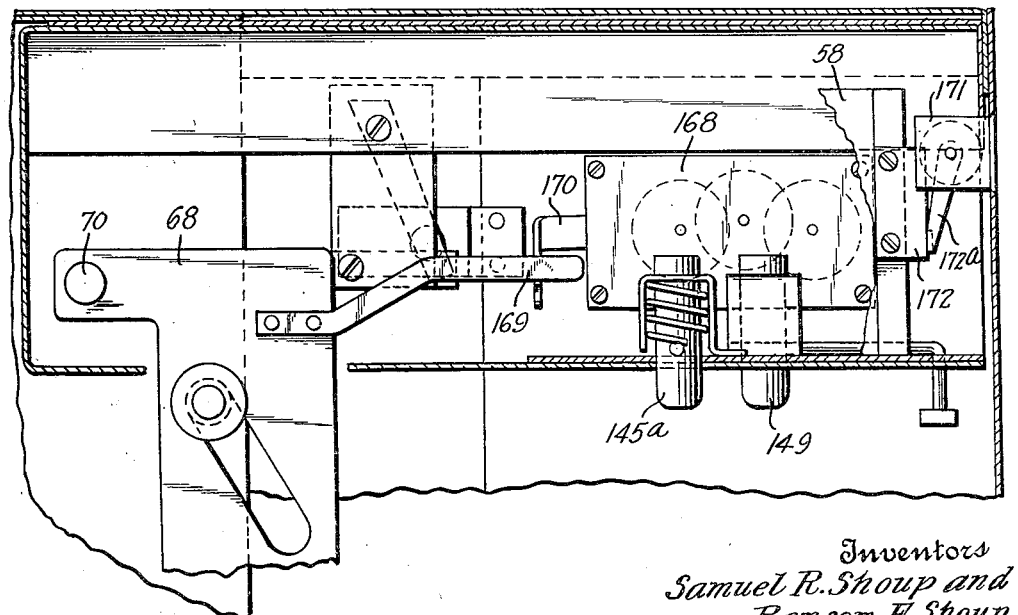
Figure 57:
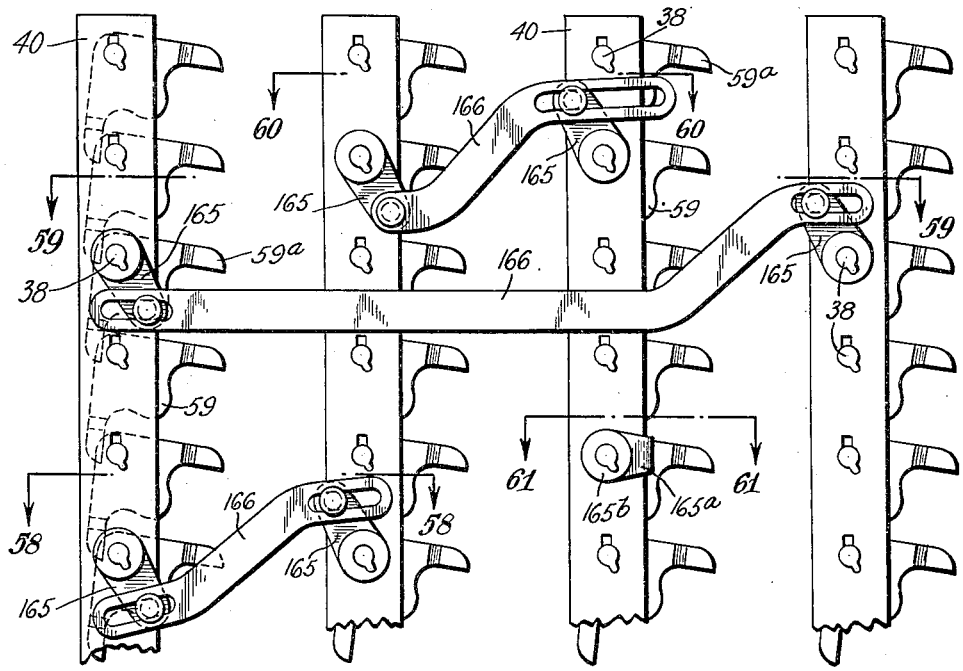
Figure 58:
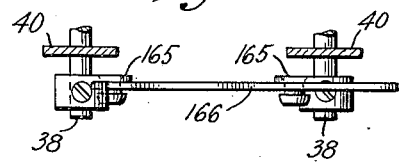
Figure 59:
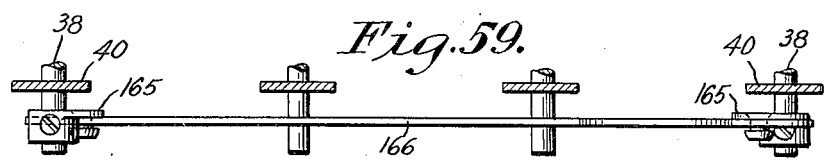
Figures 60, 61:
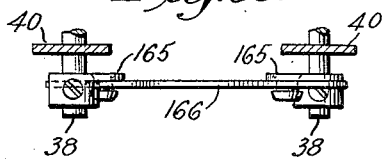
Figure 62:
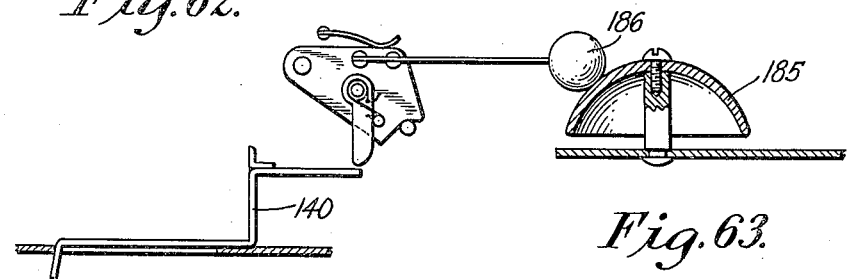
Figure 64:
Figure 63:
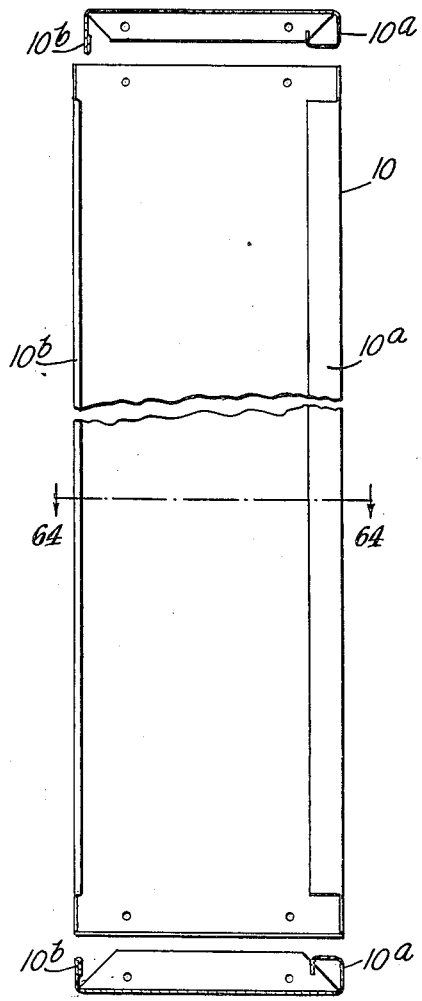

Fig. 8 is a section on the line 8—8 of Fig. 7;
Fig. 9 is a section on the line 9—9 of Fig. 7;
Figs. 10, 11, and 12 are face views of the elements which make up a ballot assembly;
Fig. 13 is a vertical section through a ballot assembly;
Fig. 14 is a partial enlarged plan view;
Figs. 15 and 16 are partial sections taken substantially on the line 15—15 of Fig. 14;
Fig. 17 is a rear elevation with the back wall of the enclosing casing removed;
Fig. 18 is a section on the line 18—18 of Fig. 17;
Fig. 19 is on the line 19—19 of Fig. 17;
Fig. 20 is an enlarged fragment of Fig. 17;
Fig. 21 is a section on the line 21—21 of Fig. 20;
Fig. 22 is a section on the line 22—22 of Fig. 21;
Fig. 23 is a fragmentary front view partially broken away;
Fig. 24 is a section on the line 24—24 of Fig. 23;
Fig. 25 is a section on the line 25—25 of Fig. 24;
Fig. 26 is a section on the line 26—26 of Fig. 25;
Fig. 27 is a section on the line 27—27 of Fig. 21;
Fig. 28 is a view similar to Fig. 27 with the parts in different position;
Fig. 29 is a section on the line 29—29 of Fig. 27;
Fig. 30 is a perspective exploded view of elements of the interlocking mechanism;
Fig. 31 is a section on the line 31—31 of Fig. 27;
Fig. 32 is a section on the line 32—32 of Fig. 17;
Fig. 33 is a section on the line 33—33 of Fig. 32;
Fig. 34 is a partial section on the line 34—34 of Fig. 32;
Fig. 35 is a section on the line 35—35 of Fig. 18;
Fig. 36 is a section on the line 36—36 of Fig. 35;
Fig. 37 is a partial face view of the shifters for the counter pinions, the counter pinions not being in position;
Fig. 38 is a view similar to Fig. 37, but with the elements in a different position;
Fig. 39 is an enlarged section on the line 39—39 of Fig. 37;
Fig. 40 is an enlarged section on the line 40—40 of Fig. 37;
Fig. 41 is a section on the line 41—41 of Fig. 17;
Fig. 42 is a side view of the disclosure in Fig. 41;
Fig. 43 is a section on the line 43—43 of Fig. 41;
Fig. 44 is a section on the line 44—44 of Fig. 18;
Figs. 45 to 48 inclusive are sections on the line 45—45 of Fig. 4 with the elements in different positions;
Fig. 49 is a section on the line 49—49 of Fig. 18;
Fig. 50 is a section on the line 50—50 of Fig. 44;
Fig. 51 is a section on the line 51—51 of Fig. 49;
Fig. 52 is a section on the line 52—52 of Fig. 49;
Fig. 53 is a section on the line 53—53 of Fig. 17;
Fig. 54 is a section on the line 54—54 of Fig. 53;
Fig. 55 is a section on the line 55—55 of Fig. 17;
Fig. 56 is a section on the line 56—56 of Fig. 55;
Fig. 57 is an enlarged fragmentary rear view;
Fig. 58 is a section on the line 58—58 of Fig. 57;
Fig. 59 is a section on the line 59—59 of Fig. 57;
Fig. 60 is a section on the line 60—60 of Fig. 57;
Fig. 61 is a section on the line 61—61 of Fig. 57;
Fig. 62 is a partial section similar to Fig. 53, showing an attachment for use with personal choice voting for presidential elections;
Fig. 63 is an exploded view of the enclosing casing;
Fig. 64 is a section on the line 64—64 of Fig. 63;
Figs. 65, 66, 67, and 68 are fragmentary views substantially on line 65—65 of Fig. 45;
Fig. 69 is a plan view showing an attachment for primary voting;
Fig. 70 is a face view of the same.
Fig. 71 is a fractional rear elevation on an enlarged scale showing the machine equipped for straight ticket voting, and
Fig. 72 is a section on the line 72—72 of Fig. 71.

Referring now more especially to Figs. 1 to 8 inclusive, the voting machine comprises a box like casing 10 in which is contained the voting mechanism. This casing is composed of sheet metal top, bottom and side plates, the front edges of which are folded as shown in detail in Figs. 63 and 64 to form substantially square flanges 10a and the rear edges of which are bent at right angles to form the flanges 10b. The rear of the casing is closed by removable back plates 10c which fit inside the bottom flange 10b and are held against the top flange 10b by suitable locking means 10d. This casing is supported by a pair of side frames 11 carrying angle irons 12 upon which the casing rests, the angle irons being provided with pins 13 which extend into holes in the casing for locating the same. The angle irons slope downwardly toward the rear of the frames and the casing rests against supports 11a provided for that purpose. The bottoms of the frames 11 are held in spaced relation by a tie rod 14 having notches which receive the cross bars 11b of the frames. Struts 15 pivoted to the side frames have their free ends bent at right angles to project into apertures in the bottom rear flange 10b. This arrangement provides a knockdown support for the casing which may easily and quickly be set up or taken down.

A curtain support 16 extends from the upper front edge of the casing and carries the two curtains 17 which form an enclosure or booth for the voter. The front edges of the curtains are movable toward and away from each other for the purpose of opening and closing the booth. A cable 18 has one end attached to a weight 19 and is trained over pulleys 20, 21, 22, and 23, the pulley 23 being mounted on a slide 25. The other end of the cable is attached to a hook 24. The edges of the curtains are attached to the cable 18 in such a way that the edges move toward and away from each other simultaneously. The slide 25 is provided with an aperture through which extends a pin 73 carried by the main cam bar 58, later to be described, which is operated either by a motor, the circuit for which includes the push button 27 or by a lever 26 connected to the pin 73 by a link 26a. Where electricity is available the lever 26 and link 26a are dispensed with. The cable 18 passes under a resilient check member 28 which is engaged by the slide 25 when the latter is in one position to render the check member inoperative (Figs. 7, 8, and 9).

With the curtain in the position shown in Figs. 1 and 2, a voter enters the booth. The voting mechanism (later to be described) is now locked. The attendant pulls out the rod 29 which, as will be later described, releases the main cam bar 58. The voter then either swings the handle 26 to the right or pushes the button 27 depending upon whether the machine is manually or electrically operated. The main cam bar 58 is thereupon operated and pulls the slide 25 which in turn pulls on the cable 18 to close the curtains 17. The operation of the main cam bar releases the voting mechanism. The main cam bar and slide are now locked in this position and cannot be returned to original position until after the attendant has pushed in the rod 29. The attendant pushes in the rod 29 and when the voter has finished voting, he either swings the handle 26 back to original position or again pushes the button 27. The main cam bar and slide 25 are returned to original position, but the cable 18 is held against return movement under the influence of the weight 19 by the check 28 until the slide reaches the limit of its return movement. During the return movement of the main cam bar and slide, the voting mechanism is reset and locked. When the slide reaches the end of its return stroke it engages the check 28 to lift the same and free the cable, thereby allowing the weight 19 to open the curtains. The booth is thus kept completely closed until the main cam bar 58 has been returned to its original position and the voting mechanism has been reset and locked. By delaying the opening of the curtains until after the voting mechanism has been reset, it is impossible for anyone outside the booth to see what voting handles have been operated by the voter.

A plurality of vertical bars 30a have their ends engaging the top and bottom flanges 10a and each pair is provided with a column of apertures through which extend spindles 38 on the front ends of which are mounted the voting handles or levers 30. Behind the bars 30a and between the columns of spindles 38 are arranged metal plates or shields 31 having apertures 31a. In back of each plate 31 are arranged a transparent protector 32, a paper ballot 33 having printed on it the names of the candidates, etc. which are visible through the apertures 31a, and a metal shutter 34 which is provided with a stud 35. The ballot and the shutter are provided with registering rectangular and square apertures 33a, 33b, 34a and 34b. The apertures 33a and 34a are slightly offset from the apertures 33b and 34b to register with other apertures later to be described. The shutters 34 are provided at their upper ends with cross bars 34c against which abut the top edges of the ballots 33 and protectors 32 and with ears 34c which support the bottom edges of the ballots and the protectors. The plates 31 and ballot assemblies consisting of the protectors 32, ballot 33 and shutter 34 are insertable as units through slots 36 in the top of the casing which slots are normally closed by the bar 36a (Figs. 2 and 7) to prevent removal. The pins 35 are received in vertical grooves 37a in a plate 37 depending from the top of the casing 10.

The spindles 38 pass through apertures in a partition 39 extending from the top to the bottom of the casing 10 and their rear ends are journaled in vertical straps 40 suspended from a horizontal strap 41, the left end of which is attached to a vertical angle iron 41a carried by the side wall of the casing and the right end of which is attached to a vertical standard 42 (Figs. 17 and 18). Tie straps 40a maintain the vertical straps 40 in spaced relation. On each of the spindles 38 is mounted a pinion 43 which meshes with the crown master gear 44 of a counter of the type disclosed in the patent to Shoup, No. 1,096,762 and which is provided with the slidable pinion 45 for locking the master gear to the unit wheel 44a (Fig. 19). These counters are enclosed in channel shaped shields 46 which engage the ballot assemblies to hold them in contact with the bars 30a thereby holding the latter against the top and bottom flanges 10a having flanges 46a through which extend the spindles 38 and bolts 39a which clamp them to horizontal bars 39b carried by the partitions 39. The shields and the columns of counters enclosed by them are arranged directly behind the shutters 34 and apertures 46b are provided in the shields in horizontal axial alinement with the counters. The pinions 45 are shifted from inoperative position (Fig. 19) to operative position and vice versa by means of yokes 47 mounted in pairs upon vertical straps 48, which rest against the partition 39 and are supported from horizontal bars 49 by bolts 49a extending through slots in the partition 39. Each pair of yokes is supported by a T-shaped member 50, (Fig. 37) which is attached to a strap 48 by a tongue 48a in such a manner that it can both reciprocate or oscillate, and a spring 51 normally holds this member in contact with the stops 52 struck up from the strap 48. The spring 51 permits relative movement of the strap 48 and the yokes 47 in the event that the master gear 44 and unit wheel 44a are not properly related to permit return of the pinion 45 from its operative to its inoperative position.

Each horizontal bar 49 is provided with a pair of rollers 53 engaging the opposite edges of a vertically reciprocating bar 54 having oblique grooves 55 at its top and bottom through which extend pins 56, projecting from blocks carried by the center plate 39 (Figs. 17 and 21). The bar 54 at its upper end carries a pin 57 which extends into a cam slot 58a in the horizontal reciprocating main cam bar 58 mounted on rollers 58b supported by shafts carried by the partition 39 and supporting a plate 39c. (Fig. 20.) Thus, when the bar 58 is caused to reciprocate, it effects reciprocation of the bar 54 and by reason of the oblique slots 55 the bar 54 is caused to move laterally. Through the rollers 53, horizontal reciprocation of the bars 49 is effected, thereby causing the pinions 46 to move from operative to inoperative position and vice versa (Fig. 22).

Each spindle 38 is provided at its rear end with an integral key 30c which prevents withdrawal of the spindle except when the key is alined with the keyway 41b (Fig. 20). Each spindle is also provided with a second integral key 38b which is received within a keyway in the corresponding pinion 43 for slidably keying the pinion to the spindle (Fig. 24). Between these keys each spindle is provided with one or more similar keys 38c. By means of the keys 38c two arms 59 are slidably keyed to each spindle. Sleeves 60 enclosing the spindles 38 are provided for holding the arms 59 against movement axially of the spindles so as to keep them keyed to the spindles. Each arm 59 has one or more extensions 59a which engage the sleeves 60 of the next lower spindle or a pin 60a carried by the bars 41 to limit rotation of the spindle (Figs. 18, 19, and 25). Both arms 59 on each spindle of said right hand vertical column are connected to draw bars 61 and a third arm 59b is loosely mounted on each spindle of this column (Fig. 21). The front arm 59 on each of the spindles except those in the left hand vertical column is connected to a similar draw bar 61. The draw bars 61 pass in pairs between the rollers having their ends projecting into vertical grooves provided in the support 42 (Figs. 21, 27 to 31). Every fifth roller 62 is tubular and has a pin 63 extending through it and apertures in the support 42 whereby these rollers are fixed, while those rollers between the fixed rollers are capable of relative movement. The draw bars connected to the top arms 59 of the right hand vertical column pass between the top roller and a bolt extending through the support 42. The bars 61 connected to the top arms of the second and third vertical columns pass between the first and second rollers. The draw bars 61 connected to the top arms in the fourth and fifth columns pass between the second and third rollers. The draw bars connected to the top arms of the sixth and seventh columns pass between the third and fourth rollers, while the draw bars connected to the top arms of the eighth and ninth columns pass between the fourth and fifth rollers. This arrangement is repeated for the draw bars of the other horizontal row of arms.

Each draw bar 61 is provided with an enlarged head 64 and sufficient play is provided between the fixed rollers to permit one head to be drawn in between a pair of rollers. After one head has been drawn in between a pair of rollers the entire play is taken up so that another draw bar cannot be moved (Fig. 28). Thus, the turning of any one of the spindles in a horizontal row or the actuation of the corresponding slide, later to be described, operates a corresponding draw bar 61 to bring its head 64 between the rollers, thus taking up the slack and preventing the operation of any of the remaining eight voting handles in the same horizontal row. The heads 64 of each pair of draw bars are arranged on opposite sides of the draw bars so that the draw bars may be laid side by side in a compact arrangement. The draw bars 61 are connected to the arms by means of pins 59' carried by the arms and extending through ears 61a attached to the bars. Each bar is supported by the spindles over which it passes as well as by the arm to which it is connected and the roller on which it rests.

The voting handles are restored to normal position after having been operated by means of a swinging frame comprising horizontal bars 65 connected by vertical straps 66 having lugs 67 arranged to engage one set of extensions of the arms 59 (Figs. 17, 18, and 19). At one end the bars 65 are connected by a vertical bar 68, the right edge of which engages rollers 65a carried by the bars 65. The bar 68 is provided at its top and bottom with oblique slots through which extend pins 69 carried by the partition 39 and at the upper end of the bar 68 is provided a stud 70 which projects into the previously described cam groove 58a of the bar 58. Reciprocation of the bar 58 effects vertical movement of the bar 68 which, in turn, moves laterally by reason of the oblique slots. Movement of the frame to locking position is effected by reason of the contact of the rollers 65a with the bar 68. Movement of the frame to its inoperative position is effected by the spring 71 provided for that purpose. The bars 65 are provided with suitable slots and grooves through which extend the spindles 38 which provide support for the frame. The frame is normally maintained in the locking position (Figs. 17 and 22) by a latch 72 which engages the top bar 65 to prevent movement of the frame toward the unlocking position.

When a voter enters the machine and the main cam bar 58 is moved to the left either manually or electrically, the bar 68 is first lifted and then the bar 54 is lifted. As a result the bar 68 is moved to the left, but movement of the bar 65 is prevented by the latch 72. The bar 54 moves to the left and by virtue of the engagement with this bar of the rollers 53, the bar 49 is moved to the left and with it the yokes 47, thereby bringing the pinions 45 into operative position. When the main cam bar 58 reaches the limit of its stroke, it engages the latch 72 thereby releasing the bar 65 and permitting the spring 71 to swing the restoring and locking frame into inoperative position, thus freeing the arms 59 and making it possible to operate the voting handles, which, up to this time, have been held inoperative. The voter now turns the various voting handles. He can turn but one voting handle in each horizontal row because of the fact that only one draw bar 61 can be actuated. As he turns the handle, the counter is advanced one digit. Having completed his vote, the voter operates the machine to return the main cam bar 58 to normal position. As the main cam bar moves to the right, the bar 54 moves downwardly and to the right, thus moving the yokes 47 and returning the pinions 45 to inoperative position. This all takes place before the stud 70 reaches the inclined portion of the cam groove. As this stud travels down the incline, the bar 68 is moved downwardly and to the right, thereby moving the bars 65 to the right and bringing the lugs 67 into engagement with the arms which have been operated, thereby restoring the same to normal position. The turning of the spindles has no effect on the counters, since the pinions 45 are in inoperative position. The pinions are moved to their operative and inoperative positons before the restoring frame reaches its inoperative and operative positions, respectively.

If a voter has failed fully to operate a handle 36, the corresponding pinion 45 probably cannot be returned to inoperative position due to the fact that the master gear 44 and unit wheel 44a are not in proper relation to permit return of the pinion. Under this circumstance, the spring 51 (Fig. 37) will permit relative movement of the strap 49 and member 50 (Fig. 38), thus preventing injury to parts involved in the operation. When the handles are restored to normal position the spring 51 will move member 50 to bring the pinion 45 into inoperative position.

The main cam bar is provided with a pair of parallel racks 74 and 75 between which is arranged a pinion 76 mounted on a shaft 77 loosely journaled in the frame 78. (Fig. 32.) This shaft carries a gear wheel 79 which meshes with a pinion 80 mounted on the same shaft with a pulley 81 driven by a belt from the motor 82. A slide 83 is mounted in a guide 84 and is provided with a cam groove 85 through which extends the shaft 77. Movement of this slide engages the teeth of the pinion 76 with either of the racks 74 or 75 to drive the main cam bar in opposite directions. The push-pull rod 29 is connected to a strap 86 which is connected by a vertical bar 87 with a horizontal slide 88. Springs 89 connect the strap 86 and the slide 88 with the slide 83, whereby the latter is yieldably pulled so that the teeth of the pinion 76 and the racks 74 and 75 will not jam. Pawls 90 and 91 are provided to engage the teeth of the rack 75, the pawl 91 being effective to prevent movement in one direction, while the pawl 90 is effective to prevent movement in the other direction. The slide 88 is provided with oblique surfaces 88a and 88b which engage pins carried by the pawls to move the same into inoperative position and permit them to drop into operative position.

The main cam bar 58 carries a lug 92 (Figs. 18 and 35) which engages either the arm 93 or the arm 94 of an arrangement of links which close the motor circuit through the contacts 95, 96 and wires 97 and 98. The spring 99 is effective to close this circuit when the lug 92 is not in engagement with either the arm 93 or the arm 94. The wires 97 and 98 continue on to the push button 27.

Assume that a voter has entered the booth. The elements above described will be in the position shown in Figs. 32 and 33, with the pinion 76 out of mesh with both racks 74 and 75 and with the pawl 91 in engagement with the rack 75. The attendant then pulls the rod 29. This moves the pinion 76 into engagement with the rack 75, and disengages the pawl 91 from the teeth of the rack 75 and releases the pawl 90. The voter now pushes the button 27 which closes the motor circuit through the wires 97 and 98, thereby causing movement to the left of the main cam bar 58. Such movement disengages the lug 92 from the arm 93, thereby permitting the spring 99 to close the motor circuit through the contacts 95 and 96 so that the motor will continue to run until the bar has completed its stroke even though the voter has taken his finger off the push button 27. When the main cam bar reaches the end of its movement, the lug 92 engages the arm 94 and opens the motor circuit. The racks terminate at such positions that the pinion runs off the end thereof just as the bar completes its stroke in either direction, thus preventing injury to the machine in case the voter holds his finger on the button 27. The ratchet 91 is not really needed with the motor-operated machine, but is essential with hand operation as it prevents a voter from returning the handle 23 to normal position until after it has been swung the full limit of its movement. After the main cam bar has reached the limit of its movement to the left, the attendant pushes in the rod 29, thus drawing the pinion 76 into mesh with the rack 75, lifting the pawl 91 and dropping the pawl 90. When the voter, after having voted, again pushes the button 27, the main cam bar returns to initial position.

The main cam bar may be actuated manually by the handle 26 but the operation is the same.

Means are provided for preventing the attendant from operating the rod 29 after he has once moved it until after the main cam bar has been actuated. The strap 86 runs through a guide 92a supported by the top of the casing 10 and is provided with ratchet teeth 93a. A double-acting pawl 94a is pivotally supported by a bolt 94 which extends through an arm 95a and the guide 92a. The arm 95a carries at its free end a link 96a which is also supported by a pivoted arm 97a. A spring 98a has one end connected to a pin on the tail of the double-acting pawl 94b and its other end to a pin on the arm 95. A pin 99a extending from the end of the main cam bar 58 is arranged to strike against the inturned ends of the link 96a thereby causing movement of the arm 95a to change the direction of pull of the spring 98a on the pawl 94b. At each end of the stroke of the main cam bar, the pawl 94b is tripped. Thus, when the bar 29 is moved in either direction it is locked against return movement by the pawl 94b until the latter is tripped by movement of the main cam bar. (Figs. 41, 42, and 43.)

Each shutter 34 is locked in front of a column of counters by engagement of the pin 35 in the cam groove 101a of a locking slide 101 (Figs. 15 and 44) having horizontal portions at the different levels. This slide rests on a shelf 101b carried by a plate 37 suspended from the top of the casing 10. The paper ballot 33 and the projector 32 are held between shoulders at the top and bottom of the shutter so that they move in unison therewith. This unit is capable of movement with respect to the plate 31 which is held stationary by reason of the engagement of the bottom thereof with the bottom of the casing 10, while the top engages the strap 36a. When the machine is in use each square aperture 34a as well as the corresponding square aperture 33a registers with one of the slots 46a in the corresponding counter shield 46 and the master gear 44 of each counter is provided with an X which is brought into register with these apertures when the corresponding voting handle is operated, thus giving a visible indication to the voter that his vote has been added on the counter as well as showing that the candidate whose name is adjacent the aperture in which the X appears, has been voted for. The totals on the counter are, however, concealed behind the solid portions of the shutters while voting is in progress.

In setting up the machine for operation, the shield and ballot assemblies are slid down between the columns of spindles and between the bars 30a and shields 46, the pins 35 being introduced into the slots 101a through the vertical portions thereof (Figs. 15 and 44). While the pins 35 are in the upper horizontal parts of the grooves 101a, the counter totals are visible through the slots 33b and 34b (Fig. 15). The slide 101 is then moved through the medium of the rack 102 and pinion 103 by means of a key provided for that purpose to move the vertical portions of the slots 101a out of register with the pins 35, (Fig. 16). The slide 101 is then locked in this position with the counter totals exposed, by two locks subsequently to be described, until the time for voting. The two locks above referred to are then unlocked to permit movement of the slide 101 which is then moved to bring the pins 35 into the lower horizontal parts of the slots 101a thereby lowering the shutter 34 to bring the apertures 34a into register with the slots in the casings 46 and to cover the counter-totals. (Fig. 16.) After the voting has been concluded, the slide is again unlocked and moved to bring the pins 35 into the upper horizontal portions of the grooves 101a thus bringing the slots 34b and 33b into register with the slots 46a so that the totals can be viewed. The bar 101 is locked with the pins 35 out of register with the vertical parts of the grooves 101a by a lock which can be unlocked only by means of a third key, thus preventing removal of the shutters 34 and ballot assemblies.

The locks above referred to are numbered 104, 105 and 106 and are of the cylinder type. They are supported in the top of the casing 10 and the rotatable portions thereof are connected to shafts 104a, 105a and 106a respectively, which extend through two spaced horizontal plates 101d supported from the shelf 101b by brackets 101e and from the top of the casing by brackets 101f. The shafts 105a and 106a carry pinions 107 and 108, the teeth of which mesh with the teeth of lock racks 109 and 110. The shaft 104a is provided with an arm 104b which is arranged to operate a pawl 111 against the action of its spring 112 which tends to force the pawl toward the slide 101. A sliding ratchet 113 provided with shoulders 113a and 113b lies on the bottom plate 101d between the pawl 111 and the slide 101. An abutment 101g is carried by the slide 101 to engage one end of the ratchet 113. (Figs. 18, 44 to 48). The other end of the ratchet 113 is provided with a lip 113c which is adapted under certain circumstances to underlie and render inoperative a pawl 114 which is pressed by spring 114c toward a ratchet 116 on the slide 101. The ratchet 113 is provided with a slot 117 and a lug 118 having a sloping face is carried by the plate 101d, this lug being adapted either to be received in the slot 117 or to underlie the front portion of the ratchet 113. The slide 101 is provided with a pair of apertures 119 and 120 into either of which may project one end of the lock rack 109 and with a second pair of apertures 121 and 122 into either of which may project one end of the lock rack 110 to lock the slide 101. The keys for the locks 105 and 106 can be inserted into or removed from the locks only when the lock racks 109 and 110 are projected into one pair of apertures 119 and 120 or 121 and 122.

Figure 65:
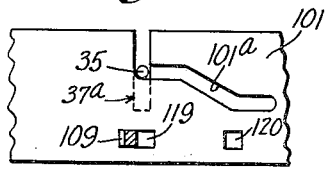
Figure 66:
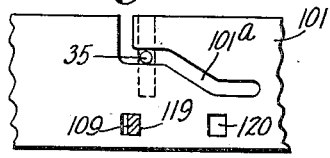
Figure 67:
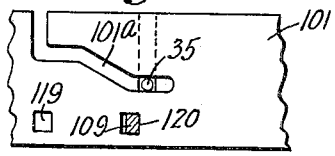
Figure 68:
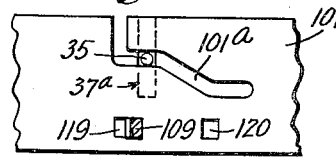

Fig. 46 shows the arrangement of the slide 101 and coacting elements to receive the ballot assemblies. In this position of the slide 101, the vertical portions of the slots 101a are in register with the slots 37a (Fig. 65). The slide 101 is at the right extremity of its path. The lock racks 109 and 110 are in retracted position and the keys are in locks 105 and 106. The pawl 114 is rendered inoperative by the lip 113c, the end of which overlies one end of the ratchet 116. The lug 118 is received in the slot 117 and the pawl 111 lies in the path of the shoulder 113a of the sliding pawl 113. The stop 101g is in engagement with one end of the sliding pawl 113.

After the ballot assemblies have been inserted with the pins 35 arranged in the vertical portion of slots 101a, the slide 101 is moved to the left to bring it into the position shown in Fig. 45 in which position the apertures 119 and 121 are in register with the lock racks 109 and 110. The locks 105 and 106 are then actuated to project the lock racks 109 and 110 into the apertures 119 and 121, after which the keys for these locks are removed and forwarded to the election inspectors. The pins 35 now lie in the upper horizontal portions of the grooves 101a out of register with the vertical portions thereof and the counter-totals are visible through the apertures 34b (Figs. 15 and 65), the counters being set at zero. In this condition, the voting machine is forwarded to the polls.

When voting is to begin, the keys for locks 105 and 106 are inserted and turned to withdraw the rack bolts 109 and 110 from the apertures 119 and 121. The slide 101 is moved further to the left to the position shown in Fig. 48 and the locks 105 and 106 actuated to project the lock racks 109 and 110 into the apertures 120 and 122 after which the keys are removed from the locks. As the slide 101 moves from the position shown in Fig. 46 to the position shown in Fig. 48, it tends to carry with it the ratchet 113, but such movement of the ratchet is impositively opposed by the lug 118. Before the slide 101 reaches the position shown in Fig. 48, the ratchet 116 positively engages the ratchet 113 and moves the same to the left, thereby releasing pawl 114 and bringing shoulder 113b into operative relation to the pawl 111. The delayed movement of the ratchet 113 insures that the pawl 114 is maintained inoperative until after the ratchet 116 has been moved out of operative relation to the pawl. The movement of the pawl 113 causes the recess 117 to move out of register with the lug 118 and also causes the pawl to ride up on the lug 118. With the slide in the position shown in Fig. 48, the pins 35 are in the lower horizontal portions of the slots 101a (Fig. 67) and the countertotals are covered by the shutter and the machine is ready for voting.

After the voting is finished, the keys are again inserted in the locks 105 and 106 and the lock racks 109 and 110 withdrawn from the apertures 120 and 122 and the slide 101 is then moved to the right until such movement is stopped by engagement of the pawl 111 with the shoulder 113b and the engagement of the left end of the ratchet 113 with the stop 101g, this position being shown in Fig. 47. This movement to the right is sufficient to bring the pins 35 into the upper horizontal portions of the slots 101a (Fig. 68), thereby bringing the slots 33b and 34b into register with the slots 46a to make visible the countertotals, but is insufficient to bring the apertures 119 and 121 into register with the lock racks 109 and 110. The ratchet 113 is held back by the pawl 111 so that the pawl 114 is released to ride over the teeth of ratchet 116, thereby preventing movement of the slide 101 to the left. In the position shown in Fig. 47, the slide 101 is locked against movement in either direction and the keys for the locks 105 and 106 cannot be removed as the lock racks 109 and 110 are in retracted position due to the fact that the apertures 119 and 121 are out of register therewith. Further movement of the slide 101 can be effected only by releasing the lock 104 as previously described. The machine is then returned with the inspector's keys in the locks to the supervisor of elections. Subsequently, the lock 104 is released and the parts returned to the position shown in Fig. 46 for the removal of the old ballot assemblies and the insertion of new ballot assemblies to prepare the machine for further use.

When the ballots are in their raised position, the motor circuit is open. At such time, a switch 125 in the motor circuit is opened by a roller 126 on a slide 127 supported by guides 127a carried by the plate 39. The slide 101 carries a lug 128 extending into a slot 129 in the slide 127 (Fig. 49), for effecting movement of the slide. The main cam bar 58 is locked by a pivoted latch 130 having a pin 131 which extends into a slot 132 in the slide 127, the latch being lowered when the slide 127 is moved to the right to open the switch 125. Thus, when the ballots are lifted, operation of the machine is prevented.

Means are provided for registering a personal choice vote: that is, voting for someone not listed on the regulation ballot (Figs. 6, 21, 53–56). The titles of the offices for which the election is held appear on a strip of paper 135 held between a metal plate 136 and a transparent protector 137, the metal plate 136 having inturned ears to form guides for the paper strip and the protector. This plate is supported at one side by a vertical angle iron 138a and at the other side by a metal plate 138 in which are provided slots 139 corresponding to the various offices. Each slot is closed by a slidable closure 140 and in back of the slots is provided a guide 141 over which is passed the sheet of paper 142 which passes from a feed roller 143 to a take-up roller 144. The feed roller is supported at the bottom by a stationary pintle 145 carried by a false bottom 146 and at the top by a yielding pintle 145a. The take-up roller is supported at the bottom by a stud shaft 147 projecting through the false bottom and having a pin 148 which fits in slots in the take-up roller to effect rotation of the same and at the top by a yielding pintle 149. The shaft 147 is journaled in a bracket 147a supported by a frame 147b. Each end of a closure 140 is offset to provide a shoulder which engages the vertical portion of a pivoted yoke 150, the yoke extending substantially the full height of the machine. A guide 140a engages the rear faces of the closure 140 which are provided with heads extending through the slots 139. The yoke 150 is carried by a pintle 150a journaled in lugs 150b mounted on a vertical angle iron 150c. A link 151 connects the lug 151a carried by the yoke 150 with an arm 152 rotatably mounted on the shaft 147 below the false bottom. This arm carries a pawl 153 which engages the teeth of a gear 154 fixed to the shaft 147 to effect rotation thereof upon oscillation of the arm. A pawl 155 carried by the bracket 147a prevents rearward rotation of the gear 154. Thus, when a closure 140 is actuated, the yoke 150 is swung, the link 151 pulls the arm 152 and the pawl 153 rides over the teeth of the wheel 154. The voter may now write in his choice upon the paper and upon the return of the yoke 150 the feed roll is advanced and the paper wound up on the roll. After a personal choice closure has been actuated, it is not possible to vote except by writing on the sheet of paper 142. This is due to the fact that the lever 160 cannot be returned to release the interlocking mechanism except by operation of the restoring frame.

The return of the yoke 150 is effected through top and bottom links 156 pivoted thereto and having slots 156a in which are received rollers 157 carried by bell crank levers 158 which are connected by links 159 with pin 57, carried by the vertical sliding bar 54 (Fig. 20). Thus, after the latter has been moved to its upper position by movement of the main cam bar 58, if the yoke 150 is operated by a closure 140, the ends of the slots in the links 156 will contact with the rollers 157 so that when the bell crank levers 158 are swung on the downward movement of the bar 54, the links 156 are returned to normal position carrying with them the yoke 150.

Means are also provided so that if a voter opens a personal choice closure, he cannot turn a voting handle in the horizontal row of such closure. This means comprises arms 160, the ends of which are engageable by the offset ends of the closures. A link 161 leads from each arm 160 to the arm 59 rotatably mounted on the corresponding spindle of the first column. This arm is attached to one of the draw bars 61. Therefore, operation of a closure pulls one of the heads 64 between rollers 62, thus preventing movement of any of the other draw bars 61. (Fig. 21.)

In connection with some offices, it is the practice to put up a plurality of candidates and the voter is allowed to vote for a certain number. For example, as shown in Fig. 6, each party has four candidates for auditors, making a total of twelve from which four are to be selected. A voter may wish to select one from each party, but this would be impossible with the normal arrangement since only one draw bar 61 of any one group could be actuated. The desired condition is made possible, however, by withdrawing enough of the pins 63 to supply sufficient play to make is possible to pull in the required number of bars 61. It is also sometimes the case that one of these candidates for auditors has been put up or endorsed by two different parties. The law, however, provides each voter can cast but one ballot for any one candidate. Means are therefore provided to prevent the voter from turning the two handles, which, unless this means were provided would give two votes to the candidate (Fig. 57). Arms 165 are attached to the two spindles 38 which would be operated by a voter in trying to cast two ballots for the endorsed candidate. These arms extend from their spindles in opposite directions and are connected by a lost motion link 166. Thus, either spindle 38 may be operated without operating the other, but after one spindle has been operated, an attempt to operate the second one will return the first one to its original position and the unit wheel of only one counter will remain in advanced position. It is sometimes necessary to prevent operation of one voting handle. An arm 165a mounted on a collar 165b is provided for this purpose (Fig. 61).

Very often only a portion of the voting mechanism will have to be used due to the fact that there are only a few parties putting up candidates or there are only a few candidates to be voted for. It is advisable that the handles not actually to be used be covered up and for this reason shields 167 are provided which may be snapped over the handles.

Counters 168 are provided for indicating the total number of times the machine is operated on the one election. These counters are actuated by means of an arm 169 carried by the bar 68 and engaging the operating arm 170 of the counter. These counters are set at zero and sealed before each election. Also a counter 171 is provided to register the total number of operations of the machine. This counter is actuated through the medium of a lug 172 fastened to cam 58, which rocks an arm 172a fastened to the shaft of counter 171. (Figs. 55 and 56.)

Sometimes certain propositions are to be balloted upon and only certain types of voters, such for example, as property owners are eligible to vote on these questions. As shown in Fig. 6, the handles for balloting on these propositions are arranged in pairs at the right of the machine, one handle being for an affirmative vote and the other for a negative vote. As shown in Fig. 17, the spindles are provided with lugs 173 either of which, when its spindle is turned prevents operation of the other spindle of the pair. A vertical bar 174 is carried by links 175 and is movable into position to engage arm 59 on these spindles to prevent operation of any of such spindles. This bar is movable by a link 176 which extends out through a hole in the casing so that the attendant may move it into position to prevent the voter from turning any of these handles. The propositions are printed on a paper strip held behind a glass plate 177 arranged in a guide 178 (Fig. 19).

In order to return the counters to zero after election is over, the plates 31 and ballot assemblies are withdrawn from between the shields 46 and the bars 30a. The bars 30a are now movable rearwardly slightly and by reason of this fact, the spindles 38 may be pushed inwardly through the pinions 43 and arms 59 a sufficient distance to disengage the keys 38c on the spindles from the keyways in the arms, the latter being prevented from moving by the sleeves 60 (Fig. 24). This permits free rotation of the spindles while held in this position and by rotating them rearwardly while in this position, the counters may be run back to zero. Before the counters can be reset the pinion 45 must be moved to operative position and to do this the main cam bar must be actuated.

Means are provided for utilizing this machine for primary elections (Figs. 69 and 70). For this use one half of the machine is fitted up for the Republican party and the other half for the Democratic party and a door 180 is hung at the middle of the machine. A pintle 181 supports the door and is provided with a pinion 182 which meshes with rack 183, the handle for which extends from one side of the casing. Thus, when a Republican enters the booth, the shutter 180 is moved to cover the Democratic side of the machine and vice versa.

The spindles 38 are normally locked against withdrawal by the end keys 38c since the arrangement of the arms 59 on the spindles 38 is such that it is impossible to rotate the spindles to bring the keys 38c into alinement with the keyways. When it is necessary for any reason to remove a spindle, the spindle is pushed in as described in connection with the re-setting of the counters to release the arms 59 from the spindles, and is turned to aline the key 38c with the corresponding keyway. The corresponding strap 40 is then moved rearwardly and is slipped off the end of the spindle thus permitting withdrawal of the spindle.

The presidential election law allows a voter to vote for the presidential electors individually; if he so desires. This machine complies with that provision by having a bell 185 with which cooperates a hammer 186 actuated by the personal choice closure 140 corresponding to the presidential voting spindles. When the voter actuates the slide 140 it causes the bell to be struck, this signifying that the voter wishes to vote for the presidential electors individually. The attendant then supplies him with a ballot having listed the names of the presidential electors, which he may check as he desires. Operation of this closure 140 locks out the other voting spindles in the manner previously described.

When the machine is to be operated manually, the slide 83 (Fig. 33) may be locked against movement, thus preventing oscillation of the shaft 77 at each operation of the push rod 29. A pin 187 is insertable through an aperture in the top wall of the casing and is adapted to project into a socket in the slide. When the pin is thus arranged the slide is held against movement, but the bar 86 and slide 88 are not locked. These elements operate as usual except for the fact that they are under some tension due to the springs 89.

Certain State laws require that provision be made for voting a straight ticket and means are provided in the above described machine for enabling a voter to vote a straight ticket. This means comprises a bar 190 for each column of spindles, except the proposition column. These bars are provided with oblique slots 191 through which extend posts 192 supported by the tie rods 40a. A spring 193 is provided for each bar 190 and tends to lift the bar upwardly. Each bar is provided with a vertical row of pins 194 which are adapted to engage one set of projections 59a of the rear arms 59 to rotate the corresponding spindles from non-voting to voting position. A plurality of straight ticket voting handles 195 are carried by spindles 196 located at the lower ends of the columns of voting spindles. Each spindle 196 carries an arm 197, the free end of which is connected by a link 198 with the bar 190. Thus, when a voting handle 195 is operated, the bar 190 is moved downwardly and laterally to rotate all the spindles in the corresponding column and move the handles thereof into voting position. As soon as the handle 195 is released, the bar 190 is moved back to inoperative position by the spring 193. If the voter takes no further action other than to actuate the restoring and locking means, he will have voted the straight ticket merely by the operation of a single handle. However, should he wish to split the ticket after having operated the straight voting handle, he may do so, due to the fact that the bar 190 is automatically returned to inoperative position as soon as the handle 195 is released. He may return any handle to voting position that he wishes to and operate the corresponding handle in a different column. The pins 194 preferably are removable so that when the nominees are less than the voting spindle in a column, the pins corresponding to the excess spindles may be removed so that only the spindles corresponding to nominees will be actuated by operation of the straight ticket handle.

It is, of course, understood that various structural changes and modifications may be made in the device above described, without departing from the spirit of the invention as defined in the appended claims.

We claim:

1. In a voting machine, a plurality of rows of counters, a shutter in front of each row, each shutter having slots adapted for axial alinement with the counters in one position of the shutters, a slide connected to said shutters to locate the same in either of two positions, means to lock said slide with said shutter in either of said two positions, and additional means for locking said slide with said shutter in one position after said shutter has been moved from and returned to said position.

2. In a voting machine, a reciprocating slide, a plurality of shutters actuated by said slide, key operated means to lock said slide in either of two positions, and automatic means effective to lock said slide in an intermediate position after movement of said slide from one of said positions to the other and partial return to the first position.

3. In a voting machine, a slide, a plurality of shutters operated by said slide, key-operated means for locking said slide in either of two different positions, automatic means for locking said slide in an intermediate position, means for preventing operation of said automatic locking means, and means to render said last-named means inoperative until after movement of the slide from one of said positions to the other and partial return to the first position.

4. In a voting machine, a plurality of shutters, a slide connected to said shutters to effect reciprocation thereof, key-operable means for locking said slide in either of two different positions, automatic means effective to lock said slide in an intermediate position after movement of the slide from one to the other of said two positions and partial return to the first position, and key-controlled means for releasing said automatic locking means.

5. In a voting machine, a plurality of shutters, a slide connected to said shutters to effect reciprocation thereof, manually-operable means for locking said slide in either of two different positions, automatic means for locking said slide in a third position intermediate the other two, and means to render said last named means inoperative during movement of the slide from one to the other of the first named positions and partial return to the third position.

6. In a voting machine, a plurality of shutters, a slide connected to said shutters to effect reciprocation thereof, manually operable means to lock said slide in either of two positions, automatic means to lock said slide in a third position, means to render said last named means inoperative during movement of the slide from one to the other of the first named positions and partial movement from the second to the third position.

7. In a voting machine, a plurality of shutters, a slide connected to said shutters to effect reciprocation thereof, means to actuate said slide, manually operable means for locking said slide in either of two positions, automatic means for locking said slide in a position intermediate the other two, and means to render said last named means inoperative during movement of the slide in one direction between said positions.

8. In a voting machine, a plurality of shutters, a slide connected to said shutters to effect reciprocation thereof, manually operated means for locking said slide in either of two positions, a ratchet carried by said slide, a spring-actuated pawl adapted to engage said ratchet to prevent movement of said slide in one direction, an abutment carried by said slide, a sliding ratchet adapted to engage said abutment, a pawl adapted to engage said sliding ratchet to prevent movement thereof in one direction, an arm extending from said sliding ratchet and being adapted to extend between said first named pawl and ratchet, and impositive means for holding the sliding ratchet with its arm projecting between said first pawl and ratchet teeth.

9. In a voting machine, a plurality of shutters, a slide connected to said shutters to effect reciprocation thereof, manually-operable means to lock said slide in either of two positions, a ratchet carried by said slide, a spring-actuated pawl adapted to cooperate therewith to prevent movement of said slide in one direction, a sliding ratchet, a spring-actuated pawl adapted to engage said sliding ratchet to prevent movement thereof in the reverse direction, an arm projecting from said sliding ratchet and being adapted to render said first pawl inoperative, impositive means for holding said sliding ratchet in said last named position, an abutment on said slide adapted to engage the other end of said sliding ratchet, and manually-operable means to render said second pawl inoperative.

10. In a voting machine, a plurality of shutters, a slide connected to said shutters to effect reciprocation thereof, manually-operable means to lock said slide in either of two positions, a ratchet carried by said slide, a spring-actuated pawl adapted to cooperate therewith to prevent movement of said slide in one direction, a sliding ratchet, a spring-actuated pawl adapted to engage said sliding ratchet to prevent movement thereof in the reverse direction, an arm projecting from said sliding ratchet and being adapted to render said first pawl inoperative, an abutment on said slide adapted to engage the other end of said sliding ratchet, a notch in one edge of said sliding ratchet, and a stop adapted to project into said notch, said stop having an oblique face.

11. In a voting machine, a boxlike casing, a partition plate, vertical strips mounted in front of said partition plate, spindles journalled in said strips and extending through said partition plate, columns of counters operatively connected to said spindles, said counters being arranged between said partition plate and vertical strips, a shield for each column of counters, a shutter interposed between each shield and a pair of said strips, operative connections between said spindles and counters and apertures in the top wall of said casing through which said shutters are introduced.

12. In a voting machine, a boxlike casing, a plurality of vertical bars, a shutter having its edges overlapping the edges of adjacent bars, a shield in back of each shutter, a column of counters in back of each shield, a horizontal spindle operatively connected to each counter, the spindles for each column being journalled at one end in the same vertical bar and apertures through the top wall of said casing for permitting the introduction of said shutters.

13. In a voting machine, a spindle having axially spaced integral keys, supports having apertures to receive said spindle, said apertures being provided with keyways corresponding to said keys, an arm mounted on said spindle and having a keyway to receive a key, an interlocking member connected to said arm, and a counter operatively connected to each spindle.

14. In a voting machine, a spindle having axially spaced integral keys, supports having apertures to receive said spindles, said apertures being provided with keyways corresponding to said keys, an arm mounted on said spindle and having a keyway to receive a key, an interlocking member connected to said arm and means to prevent axial movement of said arm.

15. In a voting machine, a spindle having angularly offset integral keys, supports having apertures to receive said spindles, each aperture being provided with a keyway, an arm mounted on each spindle and having a keyway to cooperate with a key, an interlocking member connected to each arm, means to prevent axial movement of said arm and a counter operatively connected to said spindle, one of said supports being movable to permit axial displacement of a spindle to disconnect the same from the arm carried thereby.

16. In a voting machine, a spindle, a counter operatively connected to each spindle, a member slidably keyed to said spindle, means to prevent axial movement of said member, and means supporting said spindle and permitting limited axial movement thereof to disconnect the same from the associated member.

17. In a voting machine, a plurality of columns of spindles, counters associated with said spindles, members mounted on said spindles and having two sets of wings, one set of wings being adapted to engage adjacent spindles to limit rotation of the first mentioned spindles and a locking and restoring member adapted to engage the other set of wings.

18. In a voting machine, a plurality of columns of spindles, a counter associated with each spindle, an arm carried by each spindle, a locking and restoring frame adapted to engage said arms, resilient means for moving said frame to unlock said spindles, positive means including a reciprocating bar to move said frame into locking position to restore voted spindles, and a latch to retain said frame in locking position, said latch being rendered inoperative by said reciprocating bar in one position thereof.

19. In a voting machine, a plurality of columns of spindles, a counter associated with each spindle, arms carried by said spindles, a locking and restoring frame adapted to engage said arms, a latch adapted to hold said frame in locking position, resilient means tending to move said frame to release said spindles, a latch adapted to engage said frame to prevent movement thereof under the influence of said resilient means, a reciprocating bar adapted upon movement in one direction to disengage said latch and upon movement in the other direction to restore said frame to locking position.

20. In a voting machine a plurality of voting spindles, a locking and restoring frame for said spindles, a vertical bar having oblique slots, stationary pins extending through said slots, a horizontal reciprocating bar having an oblique slot, a pin carried by said vertical bar and extending into said last named slot, rollers carried by said frame and being adapted to engage one edge of said vertical bar, resilient means tending to maintain said rollers in engagement with said vertical bar, and a latch for preventing movement of said frame under the influence of said resilient means, said latch being released by said horizontal bar upon movement thereof in a direction to effect movement of said vertical bar away from said rollers.

21. In a voting machine, a reciprocating bar, a second bar, connections between said first and second bars whereby reciprocation of said first bar effects lateral movement of said second bar, a locking and restoring frame, connections between said second bar and said frame for moving the latter in one direction, resilient means for moving said frame in the opposite direction, and a latch adapted to prevent movement of said frame under the influence of said resilient means, said latch being rendered inoperative by said first bar upon reciprocation thereof.

22. In a voting machine, a plurality of counters comprising number wheels and master gears, means shiftable to clutch and unclutch said master gears and said number wheels, voting spindles having driving connections with said master gears, locking and restoring means for said spindles, means for shifting said clutching means into and out of operative position, and means for moving said locking and restoring means out of and into operative position subsequent to the shifting of the clutch means.

23. In a voting machine, a plurality of counters comprising master gears and number gears, shiftable clutch pinions associated with said master gears and number wheels, voting spindles having driving connection with said master gears, locking and restoring means for said spindles, means to shift said clutch pinions into and out of operative position, and means to shift said locking and restoring means out of and into operative position subsequent to the shifting of said pinions.

24. In a voting machine, a pair of counters comprising master gears and geared number wheels, pinions constantly in mesh with said number wheels and shiftable into and out of gear with said master gears, a reciprocal member, a carrier mounted on said member for combined reciprocation and oscillation, a shifter for each pinion mounted on said carrier, and yieldable means tending to prevent movement of said carrier relative to said member.

25. In a voting machine, columns of spindles, a swinging locking and restoring frame associated therewith, means for actuating said frame comprising a reciprocating bar, a pair of racks carried by said bar, a pinion shiftable to engage either of said racks, means for imparting unidirectional rotation to said pinion, means to stop the rotation of said pinion at each end of the stroke of said bar and manually operable means for shifting said pinion.

26. In a voting machine, columns of spindles, a swinging locking and restoring frame associated therewith, means for actuating said frame comprising a reciprocating bar, a pair of racks carried thereby, each rack having one end extending beyond the corresponding end of the other rack, a pinion shiftable into engagement with either of said racks, a motor having a driving connection with said pinion, manually operated means for shifting said pinion into engagement with either of said racks, and means for preventing disengagement of said pinion from either rack until after said bar has been moved through its full stroke by said pinion.

27. In a voting machine, columns of spindles, a swinging locking and restoring frame associated therewith, means for actuating said frame comprising a reciprocating bar, means for controlling the direction of movement of said bar, a slide for operating said direction control means, a double acting pawl adapted to cooperate with ratchet teeth on said slide, and means carried by said bar to trip said double acting pawl at each end of its stroke.

28. In a voting machine, columns of spindles, a swinging locking and restoring frame associated therewith, means for actuating said frame comprising a sliding bar, a pair of racks carried thereby, a pinion adapted to engage either rack, a motor having driving connections with said pinion, means to move said pinion into engagement with either rack, a slide for actuating said pinion moving means, a double-acting pawl adapted to cooperate with ratchet teeth on said slide, and means on said bar for tripping said double acting pawl at each end of its stroke.

29. In a voting machine, columns of spindles, a swinging locking and restoring frame associated therewith, means for actuating said frame comprising a reciprocating bar, ratchet and pawl means for preventing movement of said bar in either direction, means for rendering said last named means partially inoperative to permit movement of said bar in one direction, a slide controlling said means and having ratchet teeth, a double acting pawl adapted to cooperate with said ratchet teeth, and means carried by said bar to trip said double acting pawl at each end of its stroke.

30. In a voting machine, a plurality of columns of counters comprising master gears, geared number wheels and pinions constantly in mesh with said number wheels and shiftable into and out of mesh with said master gears, a shifting yoke for each pinion, a reciprocable member on which said yokes are mounted in pairs for movement relative to said member and to each other, and resilient means opposing such movement of said yokes.

31. In a voting machine, a column of apertures, a slidable closure for each aperture, a vertical bar oscillatable about a vertical axis and being in the path of movement of each closure, a paper guide in back of the column of apertures, a feed roll for drawing paper across said guide, and means connected to said vertical bar for effecting limited rotation of said take-up roll upon each oscillation of said bar, operating mechanism, and means actuated by said mechanism for returning said vertical bar to normal position.

32. In a voting machine, a shutter having an aperture, a counter comprising a plurality of number wheels and a master gear having a common axis parallel to said shutter, said master wheel only being visible through said aperture, a spindle having its axis perpendicular to the counter axis and being geared to said master wheel, a ballot carried by said shutter, said ballot having an aperture registering with the shutter aperture, and a designation laterally of the aperture, a handle carried by said spindle, said handle being movable into and out of overlying relation to said designation, and an indicator on said master wheel, said indicator being adapted to register with said aperture when said handle overlies said designation.

33. In a voting machine, a column of counters, each counter comprising a plurality of number wheels and a master wheel, a slidable shutter having apertures adapted for axial alinement with said master wheels and slots adapted for axial alinement with said number wheels, said slots and apertures being offset, means to slide said shutter to aline either the slots with the number wheels or the apertures with the master wheels, spindles geared to said master wheels, handles carried by said spindles, a ballot carried by said shutter and having slots and apertures corresponding to the slots and apertures of said shutter, designations appearing on said ballot above each slot and laterally of each aperture, said handles being adapted to swing into overlying relation with the designations when the apertures are in alinement with the master wheels, and indicators on said master wheels adapted to register with said apertures when said handles overlie said designations.

34. In a voting machine, a plate, a channel member having its edges engaging said plate, a plurality of counters journalled in the sides of said channel member, each counter comprising a plurality of number wheels and a master wheel, a pair of flanges extending from one side of said channel member, a pinion shiftable to connect and disconnect said master wheel to and from said number wheels, a plurality of key carrying spindles journalled in said flanges, and means carried by said plate for actuating said pinion.

35. In a voting machine, a spindle having spaced integral keys, supports having apertures through which said spindle extends, said apertures having key-ways corresponding to said keys, a member mounted on said spindle and having a key-way to receive a key, and means to prevent axial movement of said member, one of said supports being movable to permit axial displacement of the spindle to disconnect the same from the member carried thereby.

36. In a voting machine, a pair of superposed spindles, a pair of vertically movable locking members, a pair of horizontal draw bars extending between said locking members and lying in the same horizontal plane, connections between said handles and draw bars, an upwardly extending head carried by one draw bar, and a downwardly extending head carried by the other, each head having a portion overlapping the opposite draw bar.

37. In a voting machine, columns of spindles, a swinging locking and restoring frame associated therewith, means for actuating said frame comprising a member movable to and fro, a pair of racks carried thereby, a pinion shiftable into engagement with either of said racks, means for imparting uni-directional rotation to said pinion, means to stop the rotation of said pinion at each end of the stroke of the member, manually operated means for shifting said pinion, and means for preventing shifting of the pinion except at the end of a stroke.

38. In a voting machine, columns of spindles, a swinging locking and restoring frame associated therewith, means for actuating said frame comprising a member movable to and fro, a pair of racks carried thereby, each rack having one end extending beyond the corresponding end of the other rack, a pinion shiftable into engagement with either rack, a motor having driving connection with said pinion, manually operable means for shifting said pinion, and means for locking said pinion in either of its operative positions, and means actuated by said member to release said locking means only when the pinion is beyond the end of either rack.

39. In a voting machine, columns of spindles, a swinging locking and restoring frame associated therewith, means for actuating said frame comprising a member movable to and fro, a pair of racks carried thereby, each rack having one end extending beyond the corresponding end of the other rack, a pinion shiftable to engage either rack, a motor having driving connection with said pinion, manually operated means for shifting said pinion, means to prevent shifting of said pinion except when the pinion is beyond the end of one rack, and means for stopping rotation of said pinion when in said position.

40. In a voting machine, columns of spindles, a swinging locking and restoring frame associated therewith, means for actuating said frame comprising a member movable to and fro, a pair of racks carried by said member, a pinion shiftable to engage either of said racks, means for imparting uni-directional rotation to said pinion, means to stop the rotation of the pinion at each end of the stroke of said member, a slide for shifting said pinion, locking means for said slide and actuated by said member to release said locking means at the end of each stroke thereof.

41. In a voting machine, columns of spindles, a swinging locking and restoring frame associated therewith, means for actuating said frame comprising a member movable to and fro, a pair of racks carried thereby, each rack having one end extending beyond the corresponding end of the other rack, a pinion shiftable to engage either of said racks, means for imparting uni-directional rotation to said pinion, a slide for shifting said pinion, locking means for said slide, means actuated by said member to release said locking means only when the pinion is beyond the end of either rack, and means for stopping rotation of said pinion when in said position.

42. In a voting machine, a plurality of voting spindles, a locking and restoring frame for said spindles, means including a reciprocating bar for actuating said frame, counters associated with said spindles, shutters for said counters, a slide for raising and lowering said shutters, key operated means for successively locking said slide with the counters exposed and with the counters covered, and automatic means for subsequently locking said slide with the counters exposed.

43. In a voting machine, a plurality of voting spindles, a locking and restoring frame for said spindles, means including a reciprocating bar for actuating said frame, means for sliding said bar, manually controlled means for limiting movement of said bar to one direction, locking means for said manually operable means, and means actuated by said bar at the end of each stroke to release said locking member.

44. In a voting machine, a plurality of voting spindles, a locking and restoring frame for said spindles, means including a reciprocating bar for actuating said frame, means for sliding said bar, manually controlled means for limiting movement of said bar to one direction, locking means for said manually operable means, means actuated by said bar to release said locking means at each end of its stroke, counters associated with said spindles, shutters for said counters, a slide for raising and lowering said shutters, key-operated means for successively locking said slide with the counters exposed and with the counters covered, and automatic means for subsequently locking said slide with the counters exposed.

45. In a voting machine, a plurality of rows of spindles, a counter associated with each spindle, an arm on each spindle having portions arranged to engage the adjacent spindles to limit the extent of rotation of the spindle upon which the arm is mounted, and a locking and restoring member adapted to engage said portions of said arms.

46. In a voting machine, a plurality of rows of counters, a shutter in front of each row, each shutter having slots adapted for axial alinement with the counters in one position of the shutters, a slide connected to said shutters to locate the same in either of two positions, key actuated means to lock said slide with said shutter in either of said two positions, the keys being removable from said locking means only with the locking means in slide-locking position, and additional means for locking said slide with said shutter in one position after said shutter has been moved from and returned to said position.

47. In a voting machine, a row of counters, a shutter in front of said row of counters, said shutter having slots adapted for axial alinement with the counters in one position of the shutter, a slide connected to said shutter to locate the same in either of two positions, key actuated means for locking said slide with said shutter in either of said two positions, and automatic means for locking said slide with said shutter in one position after said shutter has been moved from and returned to said position.

48. In a voting machine, a plurality of rows of counters, a shutter in front of each row, each shutter having slots adapted for axial alinement with the counters in one position of the shutters, a slide connected to said shutters to locate the same in either of two positions, key actuated means to lock said slide with said shutter in either of said two positions, the keys being removable from said locking means only with the locking means in slide-locking position, additional means for locking said slide with said shutter in one position after said shutter has been moved from and returned to said position, and key-controlled means for releasing said additional locking means.

49. In a voting machine, a row of counters, a shutter in front of said row of counters, said shutter having slots adapted for axial alinement with the counters in one position of the shutter, a slide connected to said shutter to locate the same in either of two positions, key-actuated means for locking said slide with said shutter in either of said two positions, automatic means for locking said slide with said shutter in one position after said shutter has been moved from and returned to said position, and key-controlled means for releasing said automatic locking means.

50. In a voting machine, a shutter, a slide connected to said shutter to effect reciprocation thereof, means to actuate said slide, key-actuated means for locking said slide in either of two positions, automatic means for locking said slide in a third position intermediate the other two positions, means to render said automatic locking means inoperative during movement of the slide in one direction between said first named positions, and key-actuated means for releasing said automatic locking means.

51. In a voting machine, a row of counters, a shutter in front of said row of counters and having slots adapted for axial alinement with the counters in one position of the shutter, a slide connected to said shutter to locate the same in either of two positions, key-actuated means to lock said slide with said shutter in either of said two positions, the keys being removable from said locking means only with the latter in slide-locking position, and automatic means for locking said slide with said shutter in one position after said shutter has been moved from and returned to said position.

52. In a voting machine, a reciprocating slide, a shutter actuated by said slide, means to lock said slide in either of two positions, and means for locking said slide in a position intermediate said first two positions after movement of said slide from one of said positions to the other and partial return to the first position.

53. In a voting machine, a row of counters, each counter comprising a plurality of number wheels and a master gear having a common axis, a shield overlying said counters and having slots in axial alinement therewith, each slot extending across the number wheels and master gear and being of such height as to expose only a single row of numbers, a slidable shutter overlying said shield and having slots of the same height as said shield slots but of such width as to expose only the number wheels, said shutter also having apertures offset longitudinally and laterally of said slots and of the same height as the shield slots but wide enough only to expose the master gear, said shutter slots being adapted in one position of the shutter to register with said shield slots and said shutter apertures being adapted in another position of said shutter to register with said shield slots, and means to slide said shutter between said positions, said master gears having indicia thereon visible through said apertures in one position only of the master gears.

54. In a voting machine, a curtain guide, a curtain, slidably mounted thereon, a member movable to and fro, said member in one position maintaining the voting mechanism in locked condition and in a second position releasing the voting mechanism, means connecting said member and curtain to effect closing of the latter upon movement of the former from its first to its second position, means tending to open said curtain, and means for preventing said last named means from operating said curtain, said last-named means being rendered inoperative by said member when in its first position.

55. In a voting machine, a curtain guide, a curtain supported thereby, a member movable to and fro, said member in one position maintaining the voting mechanism in locked condition and in a second position releasing the voting mechanism, a cable connected to said member and curtain whereby movement of said member from its first to its second position is effective to draw said curtain along said guide and means yieldably opposing said movement of the curtain.

56. In a voting machine, a curtain guide, a curtain supported thereby, a member movable to and fro, said member in one position maintaining the voting mechanism in locked condition and in a second position releasing the voting mechanism, a cable connected to said member and curtain whereby movement of said member from its first to its second position is effective to draw said curtain along said guide, means yieldably opposing said movement of the curtain, means to prevent return movement of said curtain under the influence of said yieldable means, and means carried by said member for rendering said preventing means inoperative when said member is in its first position.

57. In a voting machine, a curtain guide, a curtain supported thereby, a member movable to and fro, said member in one position maintaining the voting mechanism in locked condition and in a second position releasing the voting mechanism, a cable connecting said curtain and said member whereby the former is moved in one direction by the latter, a weight for moving the curtain in the reverse direction, and means normally preventing operation of said curtain by said weight, said means being rendered ineffective by said member when in its second position.

58. In a voting machine, a curtain guide, a curtain supported thereby, a member movable to and fro, said member in one position maintaining the voting mechanism in locked condition and in a second position releasing the voting machanism, a cable connecting said curtain and said member whereby movement of the member from its first to its second position draws the curtain in one direction, a weight tending to draw the curtain in the opposite direction, and a detent adapted to engage said cable to prevent return movement of said curtain under the influence of said weight, said detent being rendered inoperative by said member when in its first position.

59. In a voting machine, a curtain support, a curtain slidably mounted thereon, a member movable from a first position to a second position to condition the voting mechanism and movable from its second to its first position to restore and lock the voting mechanism, a cable connecting said curtain and member whereby movement of the latter to unlock the voting mechanism draws the former into closed position, a weight tending to restore said curtain to open position, and means adapted to engage said cable to prevent return of the curtain to open position, said means being rendered inoperative by said member upon its return to its first position.

60. In a voting machine, a member normally maintaining the voting mechanism in locked condition and movable to effect release of the voting mechanism, a curtain support, a curtain slidably mounted thereon, a cable connecting said curtain and member whereby movement of the latter to unlock the voting mechanism draws the curtain into closed position, means tending to restore said curtain to open position, and means adapted to engage said cable to prevent return of the curtain to open position under the influence of said restoring means, said preventing means being rendered ineffective by said member when in locking position.

61. In a voting machine, counters comprising master gears, geared number wheels and pinions constantly in gear with said number wheels but shiftable into and out of gear with said master gears, a shifter for each pinion, a carrier on which said shifters are mounted for relative movement and yieldable means tending to prevent relative movement of said shifters.

62. In a voting machine, a plurality of columns of spindles, a counter associated with each spindle, an arm carried by each spindle, a locking and restoring frame adapted to engage said arms, releasable means to hold said frame in locking position, means effective upon release of said holding means for moving said frame from locking position, and means for restoring said frame to locking position, said holding means being rendered inoperative by said last named means in one position thereof.

63. In a voting machine, a member movable to and fro, actuating means for said member means for limiting the movement of said member to one direction, a slide for operating said direction limiting means, and means co-operating with said slide to limit said slide to uni-directional movement between two positions thereof.

SAMUEL R. SHOUP.
RANSOM F. SHOUP.